(12) United States Patent
Martinez et al.

(10) Patent No.: US 9,797,415 B2
(45) Date of Patent: Oct. 24, 2017

(54) APPARATUS, SYSTEM, AND METHOD FOR PROVIDING FABRIC-ELASTOMER COMPOSITES AS PNEUMATIC ACTUATORS

(71) Applicant: President and Fellows of Harvard College, Cambridge, MA (US)

(72) Inventors: Ramses V. Martinez, Somerville, MA (US); George M. Whitesides, Newton, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 561 days.

(21) Appl. No.: 14/467,758

(22) Filed: Aug. 25, 2014

(65) Prior Publication Data
US 2015/0070904 A1 Mar. 12, 2015

Related U.S. Application Data

(63) Continuation of application No. PCT/US2013/028250, filed on Feb. 28, 2013.
(Continued)

(51) Int. Cl.
*F15B 15/10* (2006.01)
*B25J 9/14* (2006.01)
(Continued)

(52) U.S. Cl.
CPC ............ *F15B 15/103* (2013.01); *B25J 9/142* (2013.01); *F21V 1/12* (2013.01); *F21V 17/02* (2013.01);
(Continued)

(58) Field of Classification Search
CPC .... F15B 15/103; F15B 2215/305; B25J 9/142
(Continued)

(56) References Cited

U.S. PATENT DOCUMENTS 2,891,139 A 6/1959 Wass et al.
3,977,648 A * 8/1976 Sigmon ................ F15B 15/103
251/59

(Continued)

FOREIGN PATENT DOCUMENTS

DE 102009029972 A1 12/2010
EP 0146261 A1 6/1985
(Continued)

OTHER PUBLICATIONS

International Search Report and Written Opinion for International Application No. PCT/US2013/028250 mailed on Aug. 30, 2013 (19 pages).

*Primary Examiner* — Thomas E Lazo
(74) *Attorney, Agent, or Firm* — Wilmer Cutler Pickering Hale and Dorr LLP

(57) ABSTRACT

Soft pneumatic actuators based on composites consisting of elastomers with embedded sheet or fiber structures (e.g., paper or fabric) that are flexible but not extensible are described. On pneumatic inflation, these actuators move anisotropically, based on the motions accessible by their composite structures. They are inexpensive, simple to fabricate, light in weight, and easy to actuate. This class of structure is versatile: the same principles of design lead to actuators that respond to pressurization with a wide range of motions (bending, extension, contraction, twisting, and others). Paper, when used to introduce anisotropy into elastomers, can be readily folded into three-dimensional structures following the principles of origami; these folded structures increase the stiffness and anisotropy of the elastomeric actuators, while keeping them light in weight.

29 Claims, 31 Drawing Sheets

Related U.S. Application Data

(60) Provisional application No. 61/604,272, filed on Feb. 28, 2012.

(51) Int. Cl.
*F21V 1/12* (2006.01)
*F21V 17/02* (2006.01)

(52) U.S. Cl.
CPC ..... *F15B 2215/305* (2013.01); *Y10T 29/4998* (2015.01)

(58) Field of Classification Search
USPC .............................................................. 92/90
See application file for complete search history.

(56) References Cited

U.S. PATENT DOCUMENTS

| | | | |
|---|---|---|---|
| 4,337,921 A | 7/1982 | Edwards | |
| 5,083,498 A * | 1/1992 | Sato | F15B 15/125 73/731 |
| 5,181,452 A * | 1/1993 | Immega | B25J 9/104 91/418 |
| 5,506,012 A * | 4/1996 | Wright | B66F 3/35 254/93 HP |
| 2004/0161347 A1* | 8/2004 | Harris | F01B 19/04 417/330 |
| 2009/0173223 A1 | 7/2009 | Kudawara et al. | |

FOREIGN PATENT DOCUMENTS

| | | | |
|---|---|---|---|
| GB | 2296941 A | 7/1996 | |
| GB | 2296941 B * | 2/1998 | ........... A47C 27/081 |
| JP | S62-155306 A | 7/1987 | |
| JP | H02-113104 A | 4/1990 | |
| JP | H02-134465 A | 5/1990 | |
| JP | 46-34809 B2 | 2/2011 | |
| WO | WO-2007/094031 A1 | 8/2007 | |
| WO | WO-2013/130760 A2 | 9/2013 | |

* cited by examiner

APPARATUS, SYSTEM, AND METHOD FOR PROVIDING FABRIC-ELASTOMER COMPOSITES AS PNEUMATIC ACTUATORS

CROSS-REFERENCE TO RELATED APPLICATIONS

This application is a continuation application of the International Application No. PCT/US2013/028250, entitled "APPARATUS, SYSTEM, AND METHOD FOR PROVIDING FABRIC-ELASTOMER COMPOSITES AS PNEUMATIC ACTUATORS," filed on Feb. 28, 2013, which claims the benefit of the earlier priority date, under 35 U.S.C. §119(e), of U.S. Provisional Patent Application No. 61/604,272, entitled "PROGRAMMABLE PAPER-ELASTOMER COMPOSITES AS PNEUMATIC ACTUATORS," filed on Feb. 28, 2012. Both of the International Application and the U.S. Provisional Application are hereby incorporated herein by reference in their entirety.

STATEMENT REGARDING FEDERALLY SPONSORED RESEARCH OR DEVELOPMENT

This invention was made with government support under W911NF-11-1-0094 and W911NF-09-1-0476 awarded by U.S. Department of Defense, and under PHY-0646094 and DMR-0820484 awarded by National Science Foundation, and under DE-FG02-00ER45852 awarded by the U.S. Department of Energy. The United States government has certain rights to this invention.

INCORPORATION BY REFERENCE

All patents, patent applications and publications cited herein are hereby incorporated by reference in their entirety in order to more fully describe the state of the art as known to those skilled therein as of the date of the invention described herein.

BACKGROUND

The emphasis of much of robotic development has been on structures intended for durability, to apply force, to operate in human-unfriendly or constrained environments, and to move at high speed. Many of the structures of hard robots are based on structures derived from the body plans of mammals (or parts of them). Their skeletons are typically rigid, and electric motors (or sometimes hydraulic or pneumatic systems) provide activation. So-called "hard" robots—robots based on rigid structural elements, typically of metal and conventional mechanical joint bearings, and actuators—are highly evolved for operations in controlled environments (e.g., in manufacturing). They are, however, often heavy and not well adapted for unstructured, unstable, or fluid environments (e.g., loose gravel, sand, or mud). Robots used for performing delicate tasks (e.g., surgery) can be flexible in their movement, but are quite specialized. Airborne robots (e g, unmanned and autonomous air vehicles) are highly evolved, but do not have to deal with the vagaries of rough terrain.

"Soft" robots—robots fabricated using flexible or elastomeric structural elements—offer potentially useful approaches to overcome the challenges faced in hard robotics. They can be designed to have a low center of gravity. They can also distribute pressure evenly on the ground, or with the objects with which they interact. They can use their often highly non-linear responses of actuation to accomplish, relatively simply, types of motions and tasks (e.g., grasping soft objects) that would be very difficult to accomplish with hard robots and conventional controllers.

Pneumatic soft robots—such as those driven by micropneumatic actuators embedded in elastomeric materials—offer an underexploited entry into the family of soft robots and soft machines. For pneumatic actuation to be most useful, it should satisfy three conditions. i) It should be flexibly controllable in direction and force. ii) It should take advantage of its non-linearities to simplify the accomplishment of functions that are difficult with linear actuators. iii) It should be easily incorporated into designs that are practical to fabricate, inexpensive, and functional.

Muscle—a structure ubiquitous in nature—still has no real counterpart in materials science, robotics, or actuation; although there are examples of electromagnetic actuators and other useful structures (for example "air muscles") which have some muscle-like properties. There are a number of approaches exploring muscle-like structures as new types of components for soft robotics are developed, but few have been widely developed or deployed.

Many biologically inspired soft robots have been built using electroactive polymers (EAPs) actuators. For example, Nie et al. (*SPIE* 2007, 6423, 64232A) developed a tortoise-like flexible micro robot that can crawl and swim underwater by using legs actuated by an ionic conducting polymer film (ICPF). The response of systems based on EAPs to control signals are typically slow (unless they are very small) since they require the diffusion of ions for their flexible structures to work.

Unless intrinsically anisotropic in structure (e.g., liquid crystals) or processed (e.g., by stress orientation) to generate anisotropy, organic polymers are usually approximately isotropic in their response to stress, and thus constrained in the range of motion they can generate on actuation. New materials and structures that are easy to control, inexpensive, and compatible with soft actuation and soft robotic applications would expand the capabilities of this area of functional materials. Elastomeric polymers will be an important class of materials for soft robotics.

SUMMARY

This disclosure describes soft robotics that introduce controlled anisotropy into elastomers, and thus their response to stress (especially that caused by pressure in pneumatic actuation) can be tailored. Soft robotics capable of a range of motions that can be generated by pressurization (including extension, contraction, twisting, bending, and others) are provided.

A method of fabrication of composite structures including elastomers and embedded flexible sheets (especially paper, but also a range of other sheet and fiber materials) is described.

In one aspect, a composite actuator is provided. The composite actuator includes a flexible polymer defining a pneumatic chamber, configured to contain pressurizable fluid, and a woven or non-woven fabric sheet embedded into at least a portion of the flexible polymer. The flexible polymer conforms at least in part to the shape of the fabric sheet, and the fabric sheet comprises a plurality of creases configured and arranged to provide a plurality of folds to the flexible polymer when in a folded state and further configured to be capable of unfolding upon pressurization of the pneumatic chamber. The composite actuator further includes an inlet coupled to the pneumatic chamber for receiving the pressurizable fluid.

In one or more embodiments, the flexible polymer defining a pneumatic chamber comprises a cylinder having upper and lower end caps.

In any of the disclosed embodiments, the composite actuator further comprises an adhesive member joining at least two of folds of the flexible polymer to control a motion of the composite actuator upon unfolding of the flexible polymer.

In any of the disclosed embodiments, the adhesive member joins substantially all the folds along a face of the composite actuator.

In any of the disclosed embodiments, the adhesive member joins a portion of the folds along a face of the composite actuator.

In any of the disclosed embodiments, the adhesive member is a non-extensible strip.

In any of the disclosed embodiments, the adhesive member is an adhesive.

In any of the disclosed embodiments, the composite actuator further comprises a spring positioned to restore the actuator to its folded state.

In any of the disclosed embodiments, the spring is an extensible polymer strip spanning two spaced apart folds of the composite actuator, wherein the extensible polymer strip is in an expanded state when the extensible polymer strip is in an unfolded state and is in a resting state when the extensible polymer strip is in a folded state.

In one aspect, a method of actuation is provided. The method includes providing a composite actuator, and pressurizing the composite actuator at a pressure greater than the resting pressure to actuate the composite actuator by unfolding one or more folds of the flexible polymer.

In one or more embodiments, the actuation comprises a linear extension of the composite actuator.

In any of the disclosed embodiments, the linear actuation is used to push or lift an object.

In any of the disclosed embodiments, the folds of the composite actuator are joined along a face of the composite actuator and actuation comprises bending of the composite actuator.

In one aspect, a composite actuator is provided. The composite actuator can include an extensible polymer defining a pneumatic chamber, configured to contain pressurizable fluid, and a woven or non-woven sheet of fabric embedded into at least a portion of the extensible polymer. The sheet of fabric comprises a plurality of slits distributed about a central axis of the composite actuator, and, upon pressurization of the pneumatic chamber, the pneumatic chamber is configured to expand radially to provide a motion of the composite actuator. The composite actuator can further include an inlet coupled to the pneumatic chamber for receiving the pressurizable fluid.

In any of the disclosed embodiments, the plurality of slits span substantially a full axial length of the composite actuator.

In any of the disclosed embodiments, the plurality of slits span between 99% and 60% of the axial length of the composite actuator.

In any of the disclosed embodiments, the pneumatic chamber comprises a cylinder having upper and lower end caps.

In any of the disclosed embodiments, the sheet of fabric comprises an upper band joining an upper edge of the plurality of slits and a lower band joining the lower edge of the plurality of slits, where the actuator is configured to contract along the axial direction upon pressurization of the pneumatic chamber.

In any of the disclosed embodiments, the sheet of fabric comprises paper.

In one aspect, a method of actuation is provided. The method includes providing a composite actuator, and pressurizing the composite actuator at a pressure greater than the resting pressure to actuate the composite actuator by radially expanding the composite actuator.

In any of the disclosed embodiments, the composite actuator contracts along the axial direction upon pressurization of the pneumatic chamber.

In one aspect, a composite actuator is provided. The composite actuator includes an extensible polymer defining a pneumatic chamber, configured to contain pressurizable fluid. The composite actuator also includes a first woven or non-woven sheet of fabric embedded into at least a portion of the extensible polymer, where the first sheet of fabric is configured to cause the extensible polymer to deform into a predetermined shape upon actuation, thereby providing a motion of the composite actuator. The composite actuator further includes an inlet coupled to the pneumatic chamber for receiving the pressurizable fluid to actuate the composite actuator.

In any of the disclosed embodiments, the first sheet of fabric comprises a plurality of creases configured and arranged to provide a bellows structure to the extensible polymer.

In any of the disclosed embodiments, the plurality of creases is arranged homogeneously across the sheet of fabric.

In any of the disclosed embodiments, the first sheet of fabric is a strip that is helically wound around a central axis of the pneumatic chamber.

In any of the disclosed embodiments, the composite actuator further includes a second sheet of fabric embedded into the extensible polymer, and wherein the first sheet is offset laterally from the second sheet along an axial direction of the extensible polymer, and wherein the first and second sheets are configured to restrict movement of the extensible polymer in at least two locations to provide a bending motion in two different directions upon pressurization of the pneumatic chamber.

In any of the disclosed embodiments, the first sheet and the second sheet restrict movement of the extensible polymer in a two dimensional plane.

In any of the disclosed embodiments, the composite actuator further includes a third sheet of fabric, wherein the first sheet, the second sheet, and the third sheet are laterally offset from one another.

In any of the disclosed embodiments, there is no lateral overlap between the first sheet and the second sheet.

In any of the disclosed embodiments, a portion of the first sheet laterally overlaps a portion of the second sheet.

In one aspect, a method of making a composite actuator is provided. The method includes pre-stressing (folding) a woven or non-woven sheet of fabric to introduce a plurality of creases that provide a plurality of bellows capable of expansion and contraction, flattening the prestressed sheet and infusing the sheet with an elastomer precursor, and folding the infused sheet to form an actuator having the plurality of bellows capable of expansion and contraction. The method further includes curing the elastomer precursor to obtain a composite actuator that comprises the plurality of bellows in its resting state.

In one aspect, an actuatable lantern is provided. The actuatable lantern includes a light permeable flexible polymer defining a pneumatic chamber, wherein a light source is housed within the chamber, and a woven or non-woven sheet of fabric embedded in the flexible polymer, wherein the sheet of fabric comprises a plurality of slits arranged along an axial direction of the flexible polymer, wherein, upon pressurization of the pneumatic chamber, the sheet of fabric is configured to provide a predetermined deformation to the flexible polymer, thereby providing a motion of the flexible polymer; and an inlet coupled to the pneumatic chamber for receiving the pressurizable fluid.

BRIEF DESCRIPTION OF THE DRAWINGS

FIGS. 2a-2b is a comparison between the actuation of a pneumatic channel in (a) a homogeneous elastomeric matrix, and (b) in a paper-elastomer composite under 100 mbar of pressure over atmospheric pressure (1,013.25 mbar=1 atm).

FIGS. 3a-3d show a contracting actuator according to one or more embodiments consisting of multiple stages of bending actuators sharing a single pneumatic channel, in which (a) the schematics of the design show the layout of the pneumatic channel and the paper are provided; (b) shows the resting state ($P_{atm}$) of the bending actuator and (c) and (d) show two different actuated states ($P_1$ and $P_2$) of the device at $P_1$=70 mbar over atmospheric pressure; $P_2$=220 mbar over atmospheric pressure, respectively. The arrows indicate the polyethylene tubes used to supply compressed air for actuation.

FIG. 4 is a two-dimensional patterned sheet of paper according to one or more embodiments used to fabricate a contracting actuator that is composed of longitudinally patterned paper stripes rolled around a cylindrical pneumatic channel (See, FIGS. 5-7).

FIGS. 9a-9b show (a) the side view of a paper origami structure according to one or more embodiments obtained by folding the paper along the creases described in FIG. 8 and (b) a top view of the paper structure showed in FIG. 9a.

DETAILED DESCRIPTION

Figure 1:
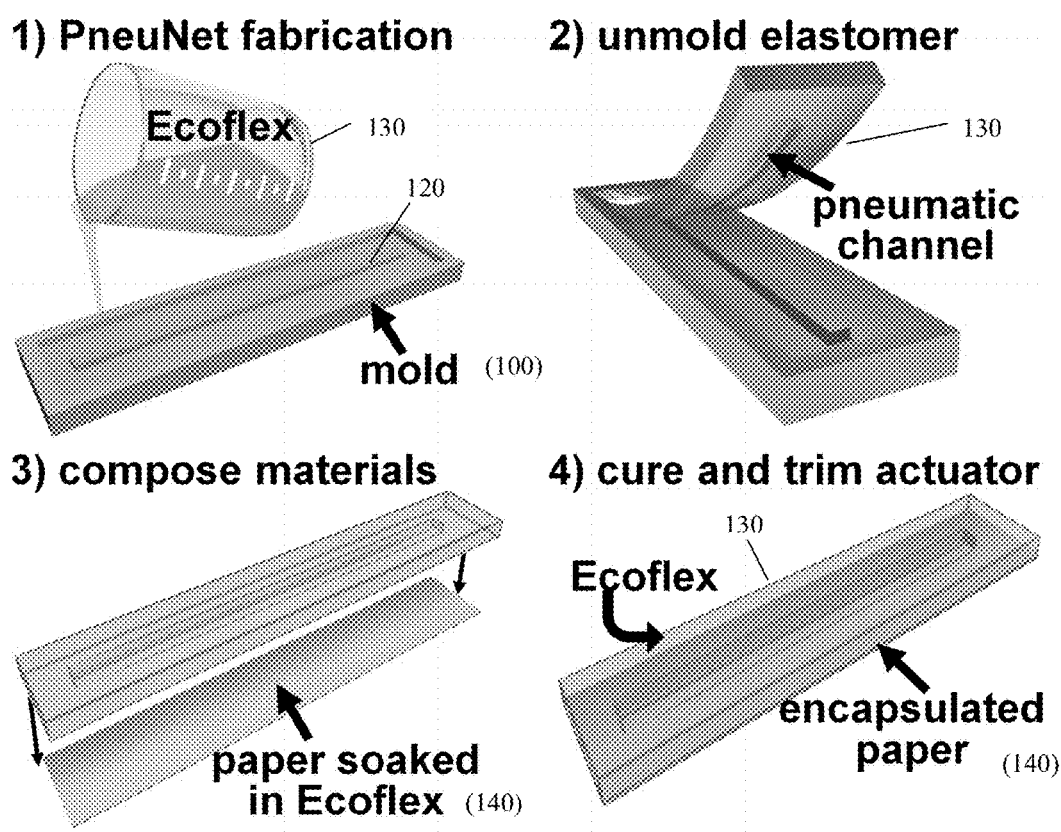
FIGS. 1-1 through 1-4 show a schematic diagram outlining the fabrication of pneumatic soft actuators according to one or more embodiments.

Soft robotics capable of range of movements are prepared using a high tensile strength sheet that is infused with a flexible polymer. The high tensile strength sheet can be cut into any desired shape and bent or creased to introduce preferential bending modes or other modes of motion. The flexible polymer permits a range of motion yet has 'memory' of its initial shape so that the robot can return to its original resting position.

A highly stretchable elastomer (e.g., Ecoflex silicone-based polymers) or flexible polymer is combined with a non-stretchable but easily bendable member (e.g., patterned paper, a woven or non-woven fabric, string, polyester or metallic meshes, and polymer films) to provide components useful in soft actuators, machines, and robots. These actuators show a range of complex motions (extension, contraction, bending, extension plus torsion) on pressurization; the corresponding motions would be difficult to achieve as simply with a hard robot. Ecoflex elastomer and other silicone-based polymers are commercially available. They are easy to work with and relatively inexpensive.

Also provided is a technique for fabricating soft actuators that can be used to generate structures with potential applications in a range of uses, from biomedical devices to tools for disaster relief (for example, soft motile robots able to navigate tight spaces in complex environments such as the rubble of a collapsed building).

The composite soft robotic structure has many useful characteristics. i) It represents a flexible and relatively inexpensive solution to the problem of constructing simple, low-cost, light-weight soft actuators. ii) Paper, as the material that defines the motion of the actuator, is light-weight, readily available, and easy to manufacture (there are highly developed technologies for cutting and folding it). Paper can also incorporate a number of other functions (for example, electrical conductivity, by including flexible metal or graphite wires). iii) Following the principles of origami, paper can be folded and rolled into a range of complex three-dimensional structures with high stiffness, anisotropic responses, and light weight. iv) Fabrication of prototypes of soft actuators based on paper-elastomer composites requires only low-cost tooling and handwork. v) Paper can also be used as a substrate for arranging sensors and electromechanical systems that would improve the adaptive interaction between a soft robot or actuator and its environment or task.

Furthermore, this composite soft robotic structure has an additional benefit that it can be easily programmed or designed to provide a desired motion. For example, the composite soft robotic structure can include an origami structure embedded in the elastomer forming a soft robot actuator, and can be configured to move in accordance with the embedded origami structure. The composite soft robotic structure has at least two salient benefits: (1) because the motion of an origami structure can easily be controlled by varying the shape of the creases in the origami structure, it is easy to design and control the motion of the associated soft robot actuator; and (2) the origami structure can provide additional physical support to the soft robot actuator, which allows the actuator to handle heavy loads.

From one perspective, the composite soft robotic structure can be considered a fabric structure with an elastomer reinforcement. While a fabric can be folded and rolled easily to form a desired shape, the shape of the fabric may be vulnerable to external forces precisely because the fabric can be folded and rolled easily. Such versatility of fabric can be disadvantageous for fabric structures. For example, if paper having a desired shape, such as a paper origami, is crushed by an external force, the paper would lose the desired shape. Therefore, designing a force-resistant origami structure with paper alone can be challenging. This issue can be addressed by infusing the fabric structure with an elastomeric material. The infused elastomer can reinforce the underlying fabric structure and help the fabric structure to retain memory of its shape. This way, the elastomer-infused paper structure can retain the desired shape for a prolonged period of time, even after being subject to external forces.

In one or more embodiments, a bendable member includes a high tensile strength sheet. The tensile strength can be defined as the force required to produce a rupture in a strip of paper. In certain embodiments, the bendable member is a fabric (e.g., a sheet formed using a woven or a non-woven collection of fibers or threads). In some embodiments, the fabric can include paper (e.g., a sheet formed using a matted collection of fibers). Paper is a remarkably versatile material. Sheets of paper are easily patterned, rolled, or folded into three-dimensional structures. The range of structures that can be fabricated by simple creasing of paper is remarkable, and is the basis of origami. Embedding paper structures into elastomeric matrices offer many possibilities for programming the mechanical properties of the resulting composites, and their response to pneumatic actuation.

Because of its high tensile strength, paper limits the extension of the structures in which it is embedded (to <5% in Ecoflex), but allows bending without significant increase in the bending modulus. Paper structures can be easily embedded or encapsulated into elastomers due to its ability to absorb the elastomers (≥308 ml/m$^2$). Additionally, paper can be folded, and enables the ability to increment the tensile strength of the device by overlapping more than one sheets of paper. The paper can be any type of paper prepared from natural or synthetic fibers. Non-limiting examples include cellulosic papers, tulle netting, cooper mesh, cotton cloth, nylon mesh, porous PET film, and porous polyester tape.

In other embodiments, it can be a processed porous polymer sheet. For example, a polyester/cellulose blend paper has a high tensile strength (~50 N/mm$^2$), is lightweight (~68 g/m$^2$), and is easily shaped by cutting.

Soft Robotic Actuators Based on Expandable Pneumatic Chambers

Soft lithography is widely used to form channels in silicones and other elastomers. These methods are used to fabricate soft pneumatic chambers inside paper-elastomer composites.

In designs where extension is desired, silicone elastomers and other known elastomers can be used as the flexible polymer. Exemplary elastomers include unsaturated rubbers that can be cured by sulfur vulcanization, such as natural polyisoprenes, cis-1,4-polyisoprene, latex, natural rubber, and trans-1,4-polyisoprene, gutta percha, synthetic polyisoprene, polybutadiene, chloroprene rubber, butyl rubber (copolymer of isobutylene and isoprene), styrene-butadiene rubber (copolymer of styrene and butadiene), nitrile rubber (copolymer of butadiene and acrylonitrile), saturated rubbers such as ethylene rubber (a copolymer of ethylene and propylene), ethylene propylene diene rubber (a terpolymer of ethylene, diene and propylene), epichlorohydrin rubber, polyacrylic rubber, silicone rubber, fluorosilicone rubber, fluoroelastomers, perfluoroelastomers, polyether block amides, chlorosulfonated polyethylene and ethylene-vinyl acetate. Ecoflex polysilicone is a translucent, soft elastomer (00-30 Shore hardness) that can withstand repeated bending, and fractures only above a maximum strain of 900%. Ecoflex can be used where high extension is necessary (e.g., the pneumatic channel).

FIG. 1 describes an exemplary fabrication process. In FIG. 1 an elastomer pre-mixture is poured over a mold 100 with features 120 designed to form the pneumatic channels, a shown in step (1). The molds used in the construction of these devices were designed using computer-aided design (CAD, Airlibre Inc.) and generated by three-dimensional (3D) printing (StrataSys Dimension Elite) with acrylonitrile butadiene styrene (ABS) plastic. Ecoflex releases readily from these molds. The molds can be used repeatedly, for example, over one hundred times with no damage to the mold or degradation in performance of the casted material. After casting the Ecoflex prepolymer 130 in the mold it is cured at 60° C. for 15 min. After curing, it is peeled off the mold, as shown in step (2). The molded channel is then placed in contact with a piece of paper 140 soaked with uncured elastomer pre-mixture, as shown in step (3). In one example, after the unmolding, the resulting open-channel structure was placed in contact with a piece of paper that had been completely filled with Ecoflex by spreading the elastomer on it, followed by degassing to remove air bubbles in a desiccator at 36 Torr for 3 min. Finally, the assembly is thermally cured to generate a sealed pneumatic channel, as shown in step (4). After baking the ensemble at 60° C. for 3 h, it cured fully, and generated the final composite device with channels. Finally, the excess paper and polymer were trimmed with scissors. The choice of materials and the design of the channels determine the response of the device, when pressure is applied. The final device is unsymmetrical in its mechanical response, because the top and bottom layers (elastomer and paper soaked with elastomer, respectively) have very different mechanical properties.

Figure 2:
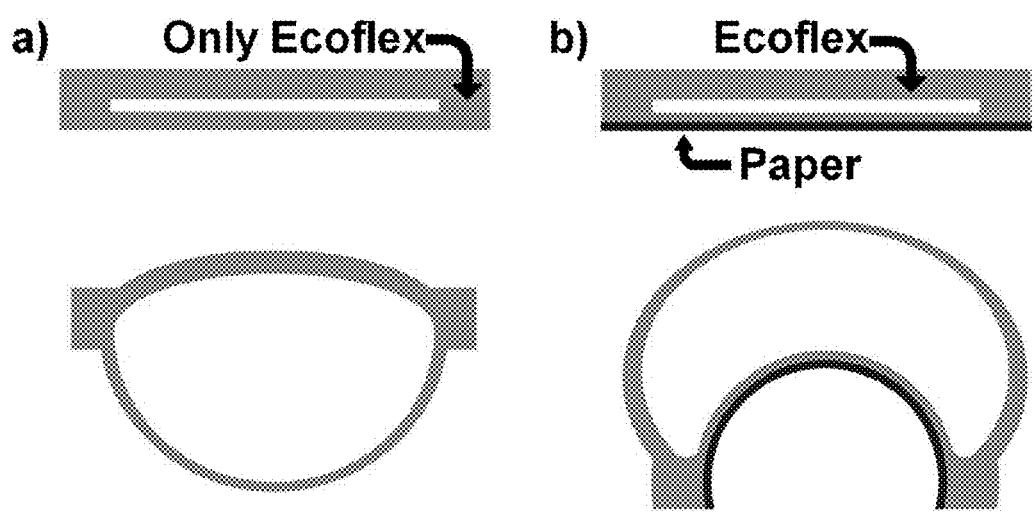

The response profile of a pneumatic chamber with and without a reinforcing paper layer is shown in FIG. 2. The channels are connected to 1.57 mm O.D. polyethylene tubing using a 1.65 mm I.D. cannula to allow for pressurization. FIG. 2A illustrates the pressurized expansion of a homogeneous elastomeric matrix. The chamber expands isotropically upon pressurization by expanding on both surfaces, albeit to a different extent due to the thickness differences of the two faces. In contract, when the chamber prepared from the same elastomer with embedded paper to form a paper-elastomer composite, pressurization of the structure results in anisotropic deformation as illustrated in FIG. 2B. The schematics are sections along the center of the long axis of the structures. In this example, the higher tensile strength of the paper limits the extension of the elastomeric matrix, and results in bending of the device on pressurization.

Bending Actuator

Figure 3:
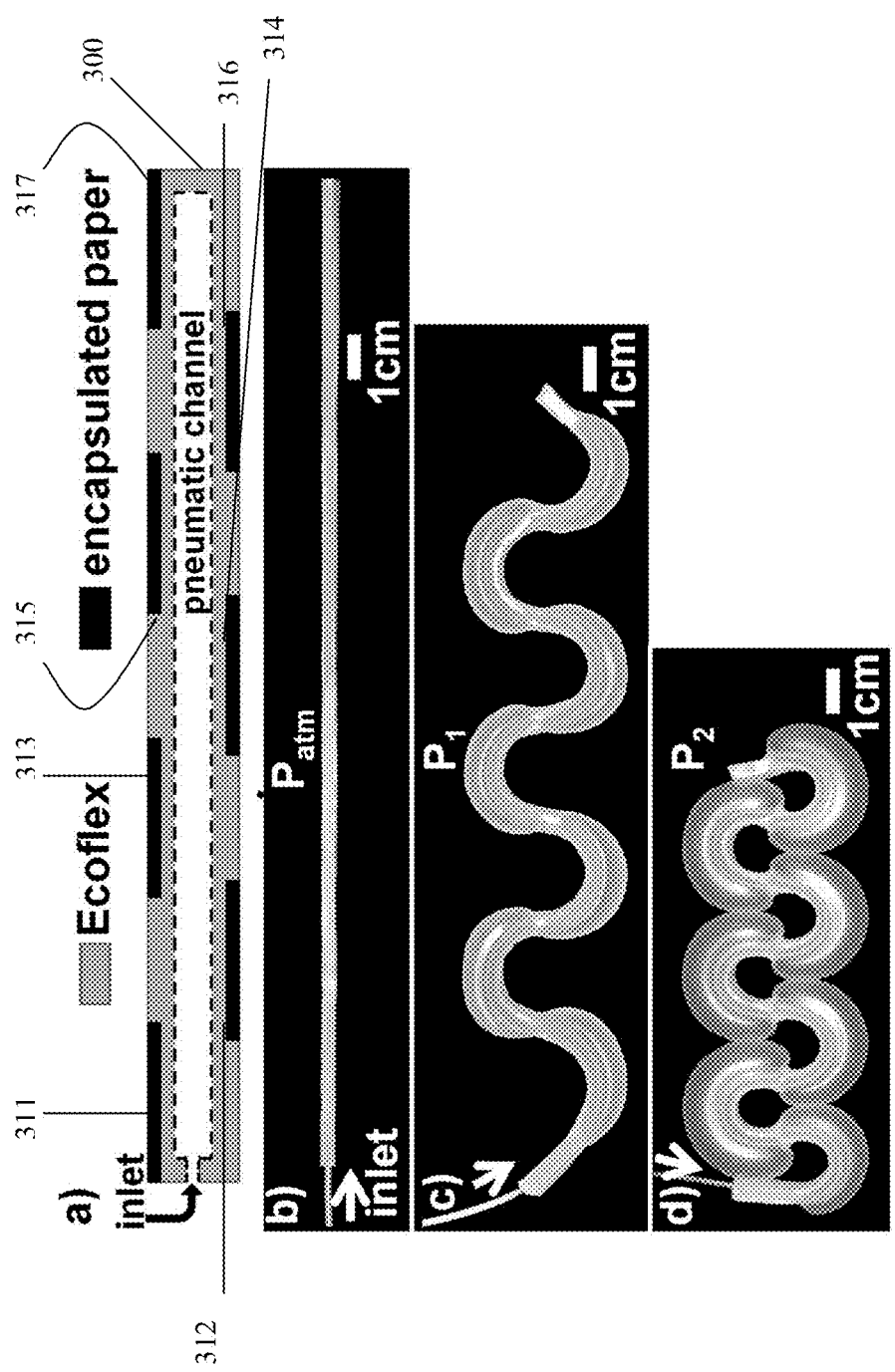
Figure 4:
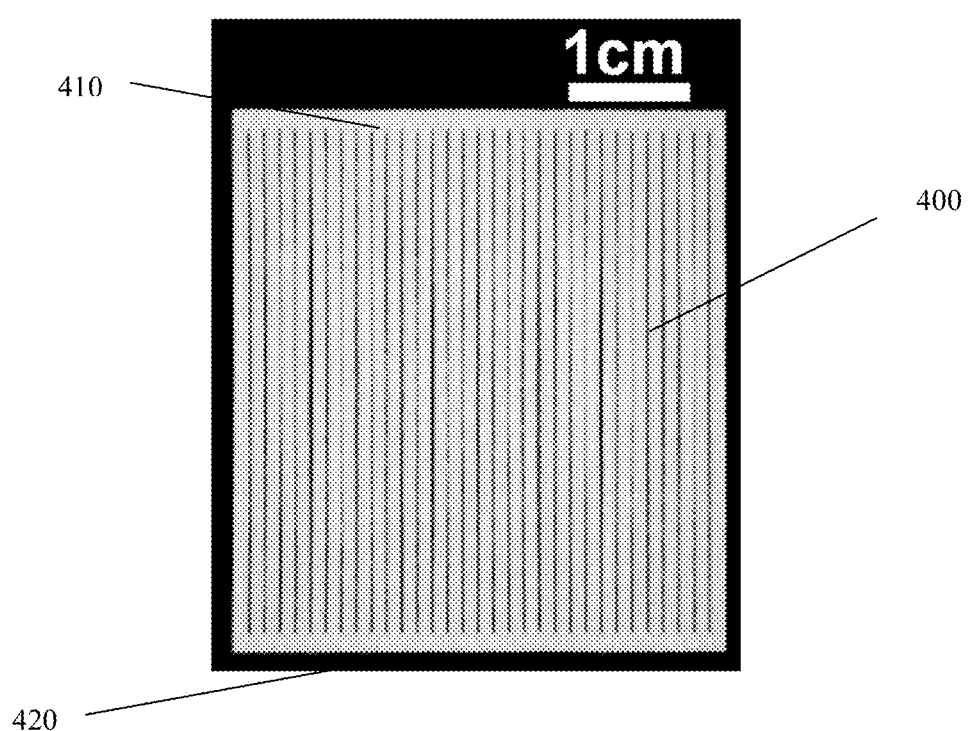

FIG. 3 provides an illustration of the motion resulting from pneumatic actuation of an elastomeric structure with a central pneumatic channel having strips of paper embedded in its upper and lower surfaces. FIG. 3A is a cross sectional view of the structure illustrating the layout of the central pneumatic channel 300 and the encapsulated paper 311, 312, 313, 314, 315, 316, 317. Paper strips 311, 313, 315, 317 are embedded in the upper face of the structure and are offset laterally from paper strips 312, 314, 316 that are embedded in the lower face of the structure. When this structure is pressurized (50-200 mbar over atmospheric pressure), the pneumatic channel expands in the regions that are most compliant (that is, that have the lowest stiffness). Since the embedded strips of paper constrain the deformation of the channel, the asymmetric elongation induced on the device causes it to bend. After releasing the pressure of the pneumatic channel, the system fully recovers its original shape. FIGS. 3B and 3C show two different actuated states ($P_1$ and $P_2$) of such a device, respectively. $P_1$=70 mbar over atmospheric pressure; $P_2$=220 mbar over atmospheric pressure. The arrows indicate the polyethylene tubes used to supply compressed air for actuation.

Linear Contractor

In certain embodiments, paper is slit to provide paper that is patterned into areas of low tensile strength (where the paper is slit) and high tensile strength (no paper cut) to provide preferential expansion or contraction of the structure. When the structure is pressurized, the elastomer between paper strips expands. Because the paper is not expandable, the structure contracts in a direction perpendicular to the direction of elastomer expansion.

Pneumatic artificial muscles (PAMs)—based on the pressurization of a thin, flexible, tubular membrane with fiber reinforcement—enhance strength and mobility when implemented in precision robotic tasks, and have also been used in other technologies such as in human exoskeleton technologies. The two dimensional pattern can be used to mimic the contraction of muscles.

$\epsilon$, a coefficient of contraction that can be defined by Eq. 1 is used to characterize the relative change of length of the actuators upon pressurization. Here $l_{P_{atm}}$ is the length of the device when no external pressure is applied to the structure ($P_{atm}$=atmospheric pressure) and $l_p$ is the length of the device upon application of a pressure (P), where P is atmospheric pressure+overpressure (in mbar). A positive sign for $\epsilon$ indicates extension on pressurization; a negative sign indicates shortening.

$$\varepsilon = \frac{l_P - l_{P_{atm}}}{l_{P_{atm}}} \quad (1)$$

In some embodiments, the paper is occupies a plane (or is folded into a pattern than unfolds in to a plane). Such embodiments are considered to be two dimensional (2D) embodiments. As an example, a contracting actuator can be composed of longitudinally patterned paper stripes rolled around a cylindrical pneumatic channel. FIGS. 4-7 illustrate a soft actuator with its design based on a PAM, which contracts on pressurization. To fabricate this device, a single sheet of paper (~200 μm thick) was trimmed and cut with a laser cutter (FIG. 4) to provide longitudinally positioned paper strips 400 that are joined by lateral bands 410, 420 at the upper and lower edges of the paper, respectively.

Figure 5:
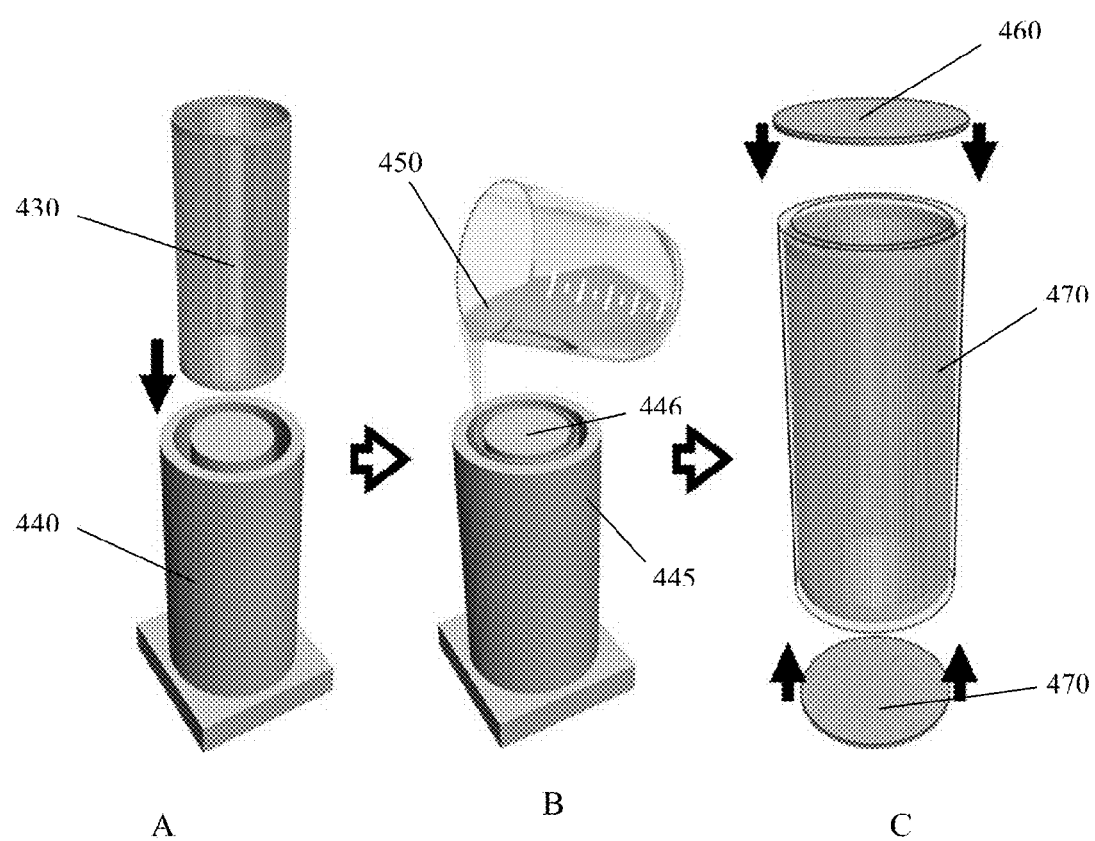
FIGS. 5A-5C show a schematic representation of the fabrication process followed to make a contracting actuator according to one or more embodiments, in which (A) the paper with the pattern shown in FIG. 4 is first arranged into a cylinder, and inserted into a cylindrical mold; (B) a pre-mixed elastomer is then poured into the mold, and cured with the patterned paper embedded; and (C) the pneumatic chamber is completed by sealing the top and bottom against two circular pieces of paper embedded in elastomer.
Figure 6:
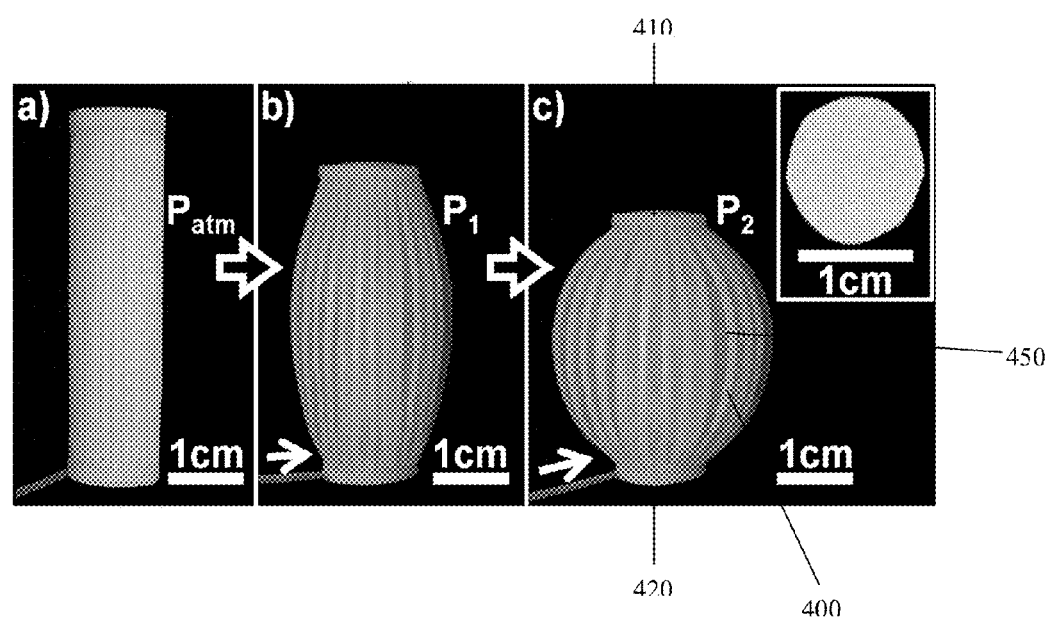
FIGS. 6a-6c show a time sequence response of a paper/elastomer contracting actuator according to one or more embodiments on pressurization showing (a) the resting state of the device under atmospheric pressure ($P_{atm}$), and (b) and (c) two different actuated states ($P_1$ and $P_2$) of the device at $P_1$=80 mbar, and $P_2$=200 mbar over atmospheric pressure, respectively.

FIG. 5 shows a schematic representation of the fabrication process. In FIG. 5A, the paper is first rolled into a cylinder 430, and inserted into a cylindrical mold 440 having an outer cylinder 445 and an inner solid core 446. The mold defines a thin tubular space 448 with a gap (e.g., of 1 mm) that holds the paper. The gap can vary but, as it defines the thickness of the elastomeric polymer, it should not be so thick that the elastomer cannot be expanded under reasonable pressure (e.g., <100 mbar over atmospheric pressure). A typical range for the structures described herein is 20-600 mbar over atmospheric pressure. A pre-mixed elastomer 450 is then poured into the mold, and cured with the patterned paper embedded. In FIG. 5B, the mold was filled with Ecoflex, and the ensemble was degassed in a desiccator (36 Torr) for 3 min to allow the liquid Ecoflex to permeate the paper completely. The paper-elastomer composite was cured at 60° C. for 15 min. In FIG. 5C, the paper-elastomer composite 470 is removed from the mold and the pneumatic chamber is completed by sealing the top and bottom against two circular pieces of paper 460, 470, also embedded in elastomer. After removing the composite structure from the mold, both ends of the tube are sealed with paper-Ecoflex caps using Ecoflex as glue to limit their deformation upon pressurization.

Figure 7:
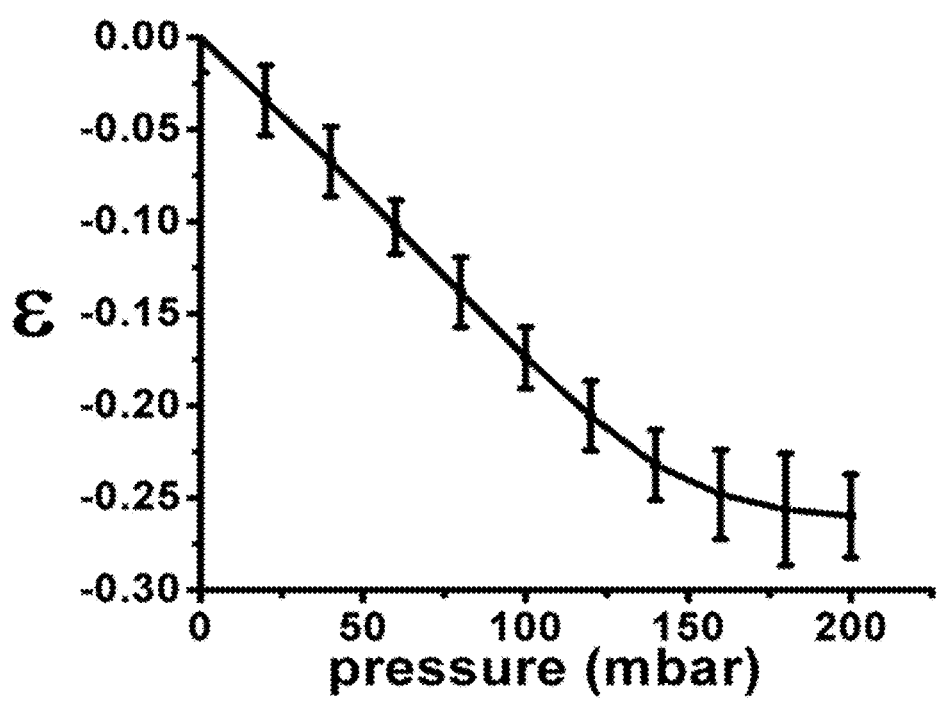
FIG. 7 is a plot showing the dependence of the contraction factor $\epsilon$ (defined in Eq. 1) on pressure, after 50 pressurization/depressurization cycles, in which the error bars show the standard deviation from the mean values for the actuator of FIG. 6.

FIGS. 6A, 6B, and 6C show the resting and actuated states of such a device under atmospheric pressure (Patm), $P_1$=80 mbar, and $P_2$=200 mbar over atmospheric pressure, respectively. As the elastomer between each embedded paper strip expands, the cylinder expands radially. The device responds by shortening (contracting) along its axis. The top and bottom of the device are constrained from expanding by the lateral paper bands 410, 420. FIG. 7 is a plot that shows the dependence of the contraction factor (Eq. 1) on pressure after 50 pressurization/depressurization cycles. $\epsilon$ was −0.27 at P=200 mbar over atmospheric pressure. The error bars show the standard deviation from the mean values.

Twisting Actuator

In some embodiments, the straining paper element is distributed in three dimensions throughout the flexible polymer body. The 3D distribution give rise to a twisting motion when the system is pressurized, as the flexible (and optionally elastomeric) polymer matrix expands and twists to expand against the pressure while constrained from expanding in a direction defined by the embedded paper, string or other restraining element. Exemplary distributed reinforcing geometries include helices, ribbons, elliptical, oval, and zig-zag shapes, which when rolled in the manner illustrated in FIGS. 19-22, can provide a twisting motion when pressurized.

Figure 19:
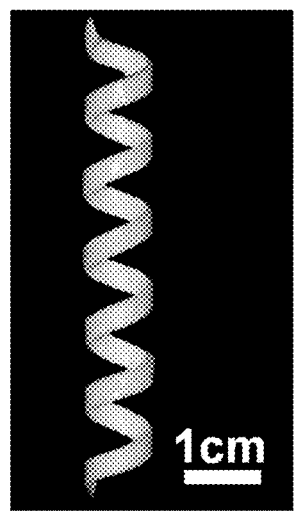
FIG. 19 three-dimensional pattern of a strip of paper in a helical shape used to fabricate a soft paper/elastomer twisting actuator according to one or more embodiments.
Figure 21:
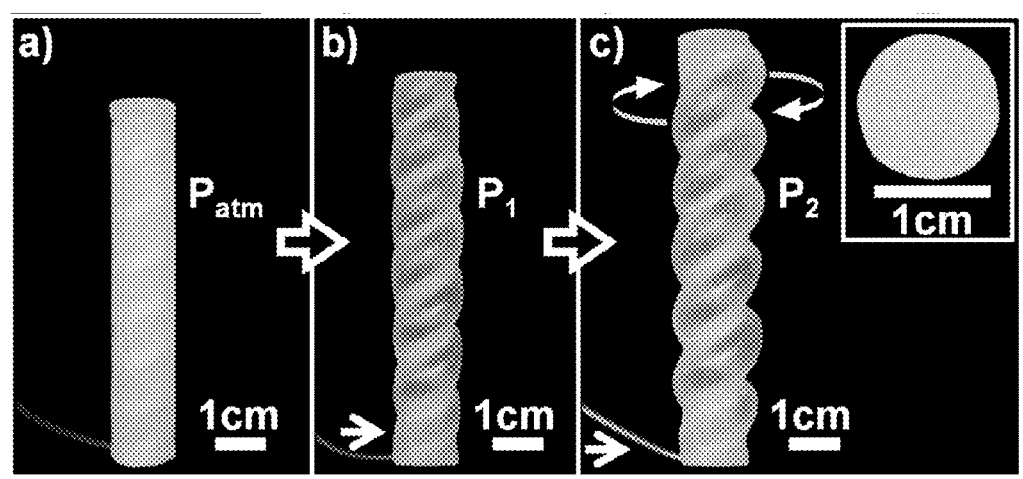
FIGS. 21a-21c show a twisting soft actuator according to one or more embodiments, in which (a) shows a side view of the actuator in its resting state; (b-c) show the actuated states of the device under an applied pressure of $P_1$=50 mbar and $P_2$=120 mbar over atmospheric pressure, respectively.
Figure 22:
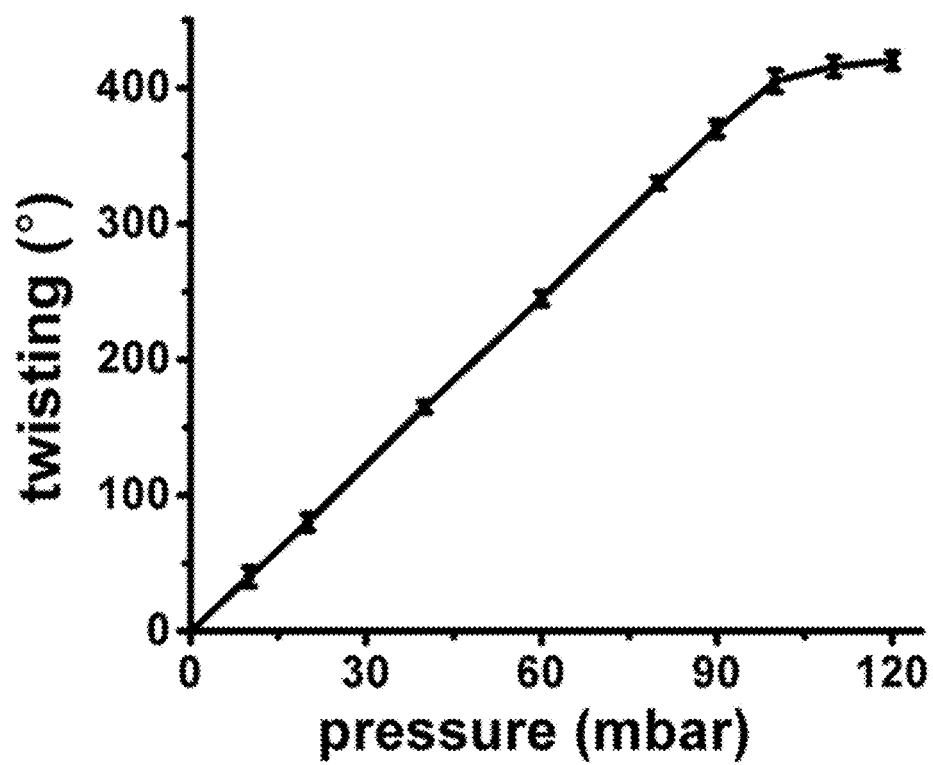
FIG. 22 is a plot illustrating the pressure dependence of the twisting angle (degrees) after 50 pressurization/depressurization cycles for the actuator of FIG. 21.
Figure 23:
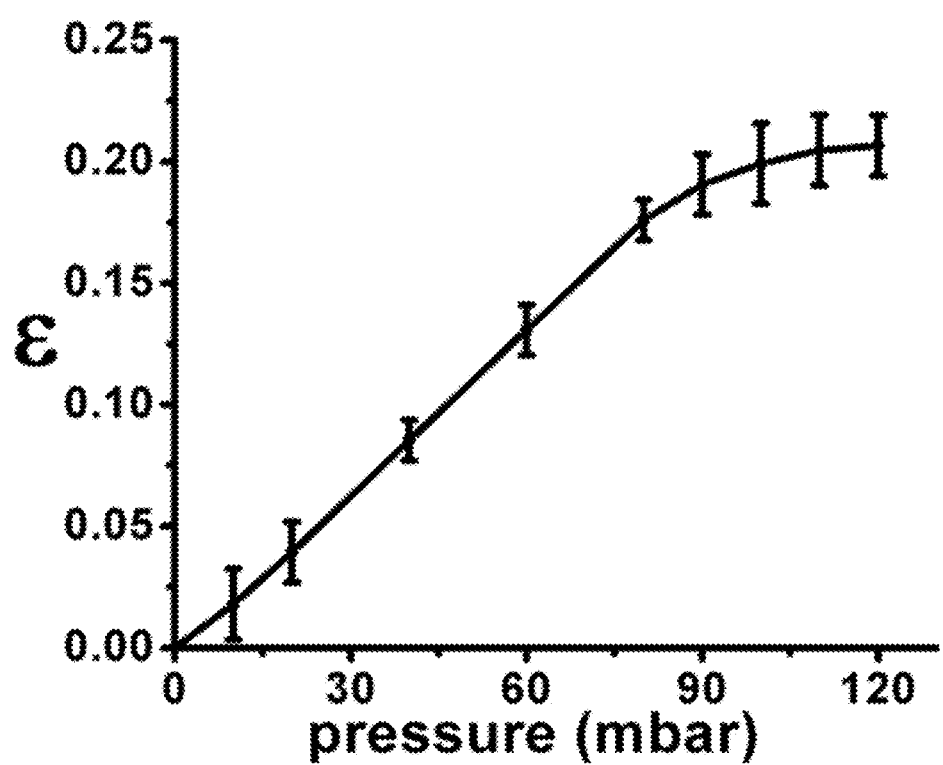
FIG. 23 is a plot showing the pressure dependence of the elongation factor $\epsilon$ after 50 pressurization/depressurization cycles for the actuator of FIG. 21.

In some embodiments, embedding a helical strip of paper into an elastomeric tube results in a motion that combines twisting and extension. FIGS. 19-22 shows an actuator that can twist up to 420° upon pressurization. It weighs 7.9 g and is able to apply a torque of 0.015 N·m at a pressure of 120 mbar over atmospheric pressure. The actuator recovers its original shape without significant hysteresis when the internal pressure returns to ambient. FIG. 19 illustrates the helical arrangement of the restraining paper. Because the paper in its resting state is distributed over three dimensions (e.g., the paper occupies both area and height), the actuator is described as having a 3D paper structure. The pressurization of the central channel both elongates the tube and causes it to twist around its long axis. The degree of elongation will depend upon the diameter and winding density (pitch) of the helically wound paper strip. FIG. 21A shows a twisting actuator that includes a paper helix embedded in an elastomeric cylinder with a hollow core. FIGS. 21B and 21C illustrate actuated states of the twisting actuator device under an applied pressure of $P_1$=50 mbar and $P_2$=120 mbar over atmospheric pressure respectively. As the device is pressurized, the paper helix prevents the elastomeric cylinder from expanding freely in the lateral direction. The device simultaneously rotates about a central axis and extends along the same central axis in an effort to relieve the restraining force exerted by the helical paper on the elastomeric body. FIGS. 22 and 23 illustrate the pressure dependence of the twisting angle and the elongation after 50 pressurization/depressurization cycles.

Figure 20:
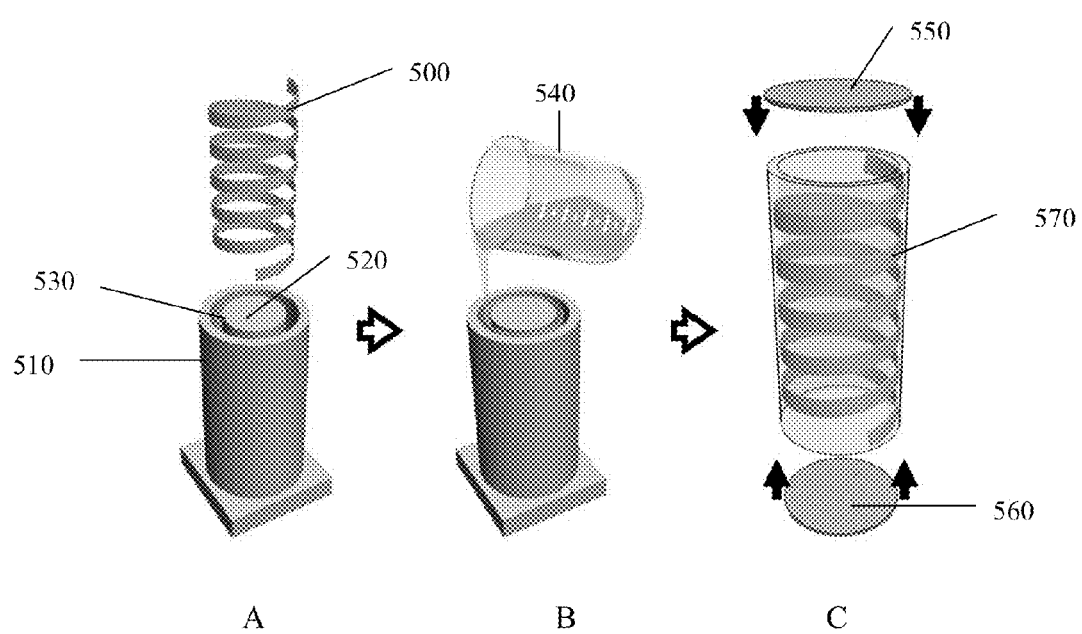
FIGS. 20A-20C illustrate the fabrication process of a twisting actuator according to one or more embodiments, in which (A) the paper with the pattern shown in FIG. 19 is first inserted into a cylindrical mold; (B) an elastomer pre-mixture is then poured into the mold, and cured with the patterned paper embedded; and (C) the pneumatic channel is completed by sealing the top and bottom with an elastomer saturated top and bottom cap.

The fabrication process is shown in FIG. 20. The helical paper strip 500 is first inserted into a cylindrical mold 501 having an outer cylindrical wall 510 and an inner rod or core 520 that defines a thin cylindrical gap 530, as shown in FIG. 20A. The mold defines a thin tubular space 530 with a gap (e.g., of 1 mm) that holds the paper. The gap can vary but, as it defines the thickness of the elastomeric polymer, it should not be so thick that the elastomer cannot be expanded under reasonable pressure (e.g., <100 mbar over atmospheric pressure). A typical range for the structures illustrated in FIG. 20 is 20-600 mbar over atmospheric pressure. An elastomer pre-mixture 540 is then poured into the mold, and cured with the patterned paper embedded, as shown in FIG. 20B. Finally, sealing the top 550 and bottom 560 completes the pneumatic channel 570.

Figure 24:
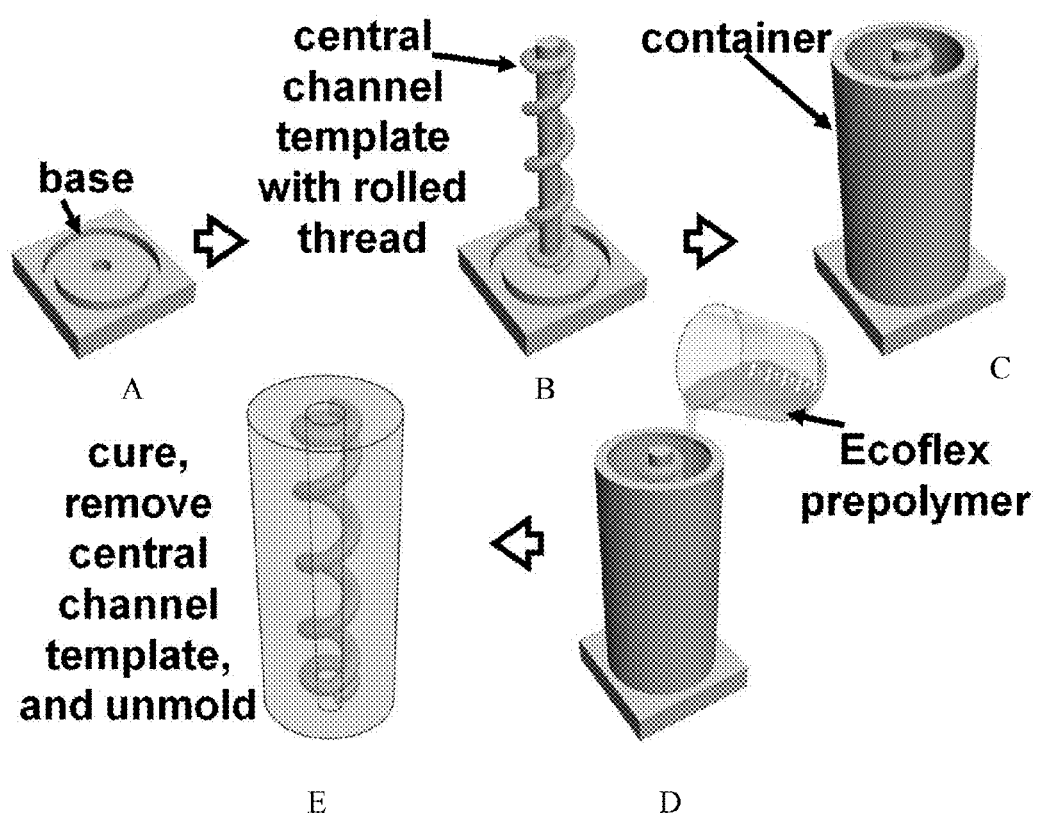
FIGS. 24A-24E show a schematic representation of a process to fabricate a soft twisting actuator by (A) providing a base equipped with a groove for receiving a outer cylinder and a recess for receiving a central channel post; (B) arranging a restraining member helically wound the central channel post; (C) assembling the outer retaining cylinder; (D) adding the elastomeric prepolymer to the mold and allowing the prepolymer to infuse into the helically wound restraining member, followed by curing; and (E) removing the device form the mold, followed by completing the pneumatic actuator by gluing both ends of the actuator with Ecoflex to seal the pneumatic channel.
Figure 25:
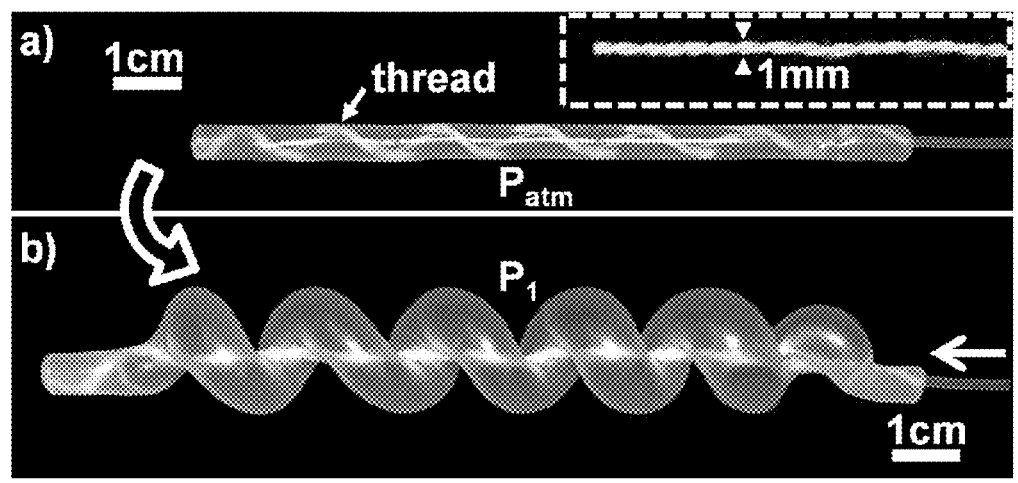
FIGS. 25a-25b show the twisting actuation of the soft actuator according to one or more embodiments in which (a) shows the actuator device in its resting state at $P_{atm}$ (inset in (a) corresponds to the optical image of the lateral cross section of the thread embedded in the actuator device); and (b) is the actuator device in an actuated state ($P_1$=125 mbar over atmospheric pressure).

In another embodiment, the three dimensional distributed restraining element can be string, instead of paper. In certain embodiments, the twisting actuator includes a helically wound thread embedded in an elastomeric tube (see FIGS. 24-25). The tube, when sealed at both ends forms the pneumatic chamber. FIG. 24 is a schematic representation of a process to fabricate a soft twisting actuator by (A) providing a base equipped with a groove for receiving a outer cylinder and a recess for receiving a central channel post; (B) arranging a restraining member helically wound the central channel post; (C) assembling the outer retaining cylinder; (D) adding the elastomeric pre-polymer to the mold and allowing the pre-polymer to infuse into the helically wound restraining member, followed by curing; and (E) removing the device form the mold, followed by completing the pneumatic actuator by gluing both ends of the actuator with Ecoflex to seal the pneumatic channel. The fabrication process is similar to the one shown in FIG. 20, except that the walls of the device are thicker. The fabrication allows manufacture of different devices, controlling its thickness at will.

FIG. 25A shows the resting state (Patm) of such a device prepared according to the method described above. The inset in FIG. 25A corresponds to the optical image of the thread embedded in the actuator. FIG. 25B shows the actuated state at $P_1$=125 mbar over atmospheric pressure of the device. The pressurization of the central channel both elongates the tube and causes it to twist around its long axis. The degree of elongation will depend upon the diameter and winding density (pitch) of the helically wound thread. Because string lacks the flatness of paper, it is possible for the string to fully extend under appropriate pressurization. Thus, the degree of extension and twisting can be carefully controlled and can be greater than for the corresponding device having a paper helix embedded therein.

Soft Robotic Actuators Based on Pleated Structures
Extensor and Lifters

Origami is an art (and a science) that guides the fabrication of three-dimensional paper structures by folding. Embedding folded paper structures in elastomeric or flexible polymers makes it possible to fabricate soft pneumatic actuators in which motion on pressurization is determined by the pattern of folds in the paper.

Any flexible polymer may be used. High elasticity is not required, as the paper typically limits the expansion of the polymer. Exemplary flexible polymers include unsaturated rubbers that can be cured by sulfur vulcanization, such as natural polyisoprenes, cis-1,4-polyisoprene, latex, natural rubber, and trans-1,4-polyisoprene, gutta percha, synthetic polyisoprene, polybutadiene, chloroprene rubber, butyl rubber (copolymer of isobutylene and isoprene), styrene-butadiene rubber (copolymer of styrene and butadiene), nitrile rubber (copolymer of butadiene and acrylonitrile), saturated rubbers such as ethylene rubber (a copolymer of ethylene and propylene), ethylene propylene diene rubber (a terpolymer of ethylene, diene and propylene), epichlorohydrin rubber, polyacrylic rubber, silicone rubber, fluorosilicone rubber, fluoroelastomers, perfluoroelastomers, polyether block amides, chlorosulfonated polyethylene and ethylene-vinyl acetate. Alternatively, the elastomeric polymers described previously for use in expandable pneumatic devices can also be used.

In one or more embodiments, a high tensile strength sheet is used. In certain embodiments, the sheet is paper (e.g., a sheet formed using a matted collection of fibers). In other embodiments the sheet is a fabric (e.g., a sheet formed using a woven collection of fibers or threads). In still other embodiments, it can be a processed porous polymer sheet. The paper can be any type of paper prepared from natural or synthetic fibers. Non-limiting examples include cellulosic papers, tulle netting, cooper mesh, cotton cloth, nylon mesh, porous PET film, and porous polyester tape. Paper structures can be easily embedded into elastomers. Polyester/cellulose blend paper has a high tensile strength (~50 N/mm$^2$), is light-weight (~68 g/m$^2$), readily absorbs polymers and is easily shaped by cutting. Paper absorbs Ecoflex to a level of ~300 mL/m$^2$ for polyester/cellulose blend paper. Because of its high tensile strength, paper limits extension of structures in which it is embedded (to <5% in Ecoflex), but allows bending without significant increase in bending modulus. Moreover, paper can be readily folded. Tensile strength of the folded structures can be increased by overlapping more than one sheet of paper. Tensile strength can be measured using standards techniques. The paper used for robotics having pleated structures using folded paper is similar to that used in the soft robotics using expandable pneumatic chambers. The creases on the paper, however, direct the actuation of the origami devices. The creases can permanently change the mechanical properties of the paper, which can, in effect, be transferred to the elastomer to direct the actuation.

The embedded paper structures can reinforce the elastomeric matrix, and generate actuators that can withstand pressures up to 300 mbar over atmospheric pressure, and therefore manipulate heavy loads (up to 0.3 kg/cm$^2$ of supporting surface). Moreover, since the actuation depends on the number of pleats that are unfolded, large extension (large positive values of $\epsilon$) can be easily achieved by increasing the number of folds in the paper.

Figure 8:
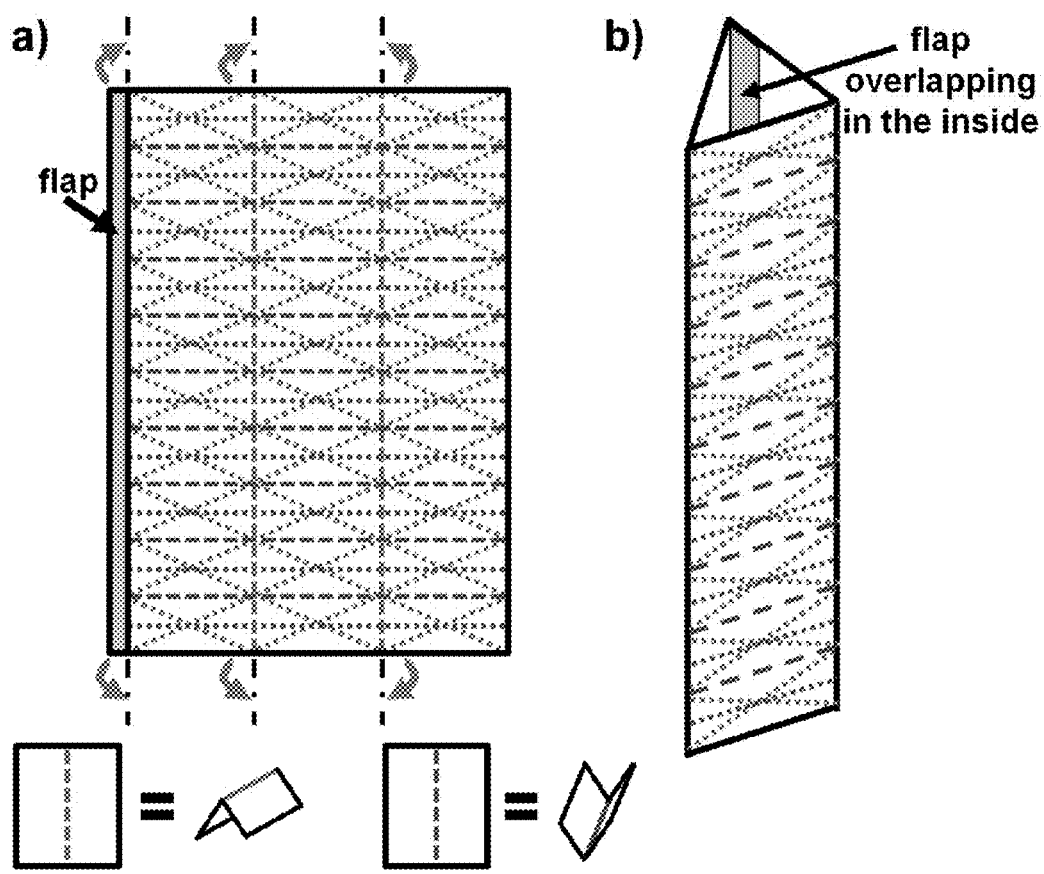
FIGS. 8a-8b illustrate a folding scheme in a flexible sheet such as paper used to fabricate origami soft actuators according to one or more embodiments.
Figure 9:
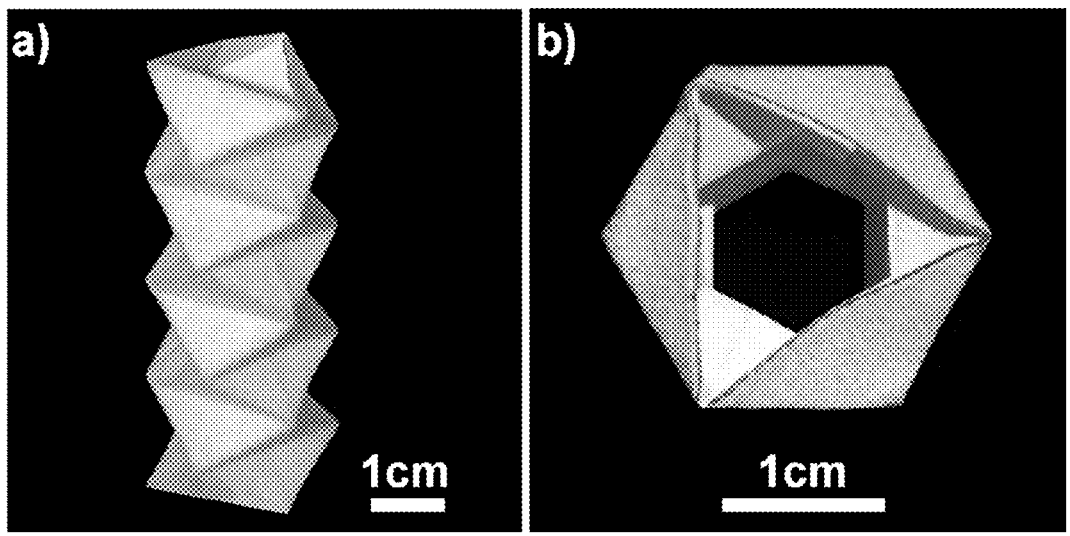

To demonstrate this strategy, an accordion-like structure is pleated from a single, rectangular piece of paper. FIGS. 8-9 describe the origami design. FIG. 8A shows the marks used to provide a plurality of creases on a rectangular piece of paper. The creases can be formed by folding, pressing, and/or crushing. The creased piece of paper is then folded along the three vertical axis shown in FIG. 8B. The flap closes the structure by overlapping a flap. FIGS. 9A and 9B show the paper origami structure obtained by folding the paper along the creases defined in FIG. 8A in side view and top view, respectively. The creases in the paper provide areas of differential tensile strength throughout the paper. The paper also provides a template to define an origami shaped flexible polymer form, when it is embedded in a polymer base. Thus, when the paper is subjected to a stress, for example, the paper-elastomer composite responds by folding and unfolding along the crease lines introduced into the embedded paper. The actuator, which remains contracted in unpressurized state, extends as the pleated structure unfolds upon pressurization.

Figure 10:
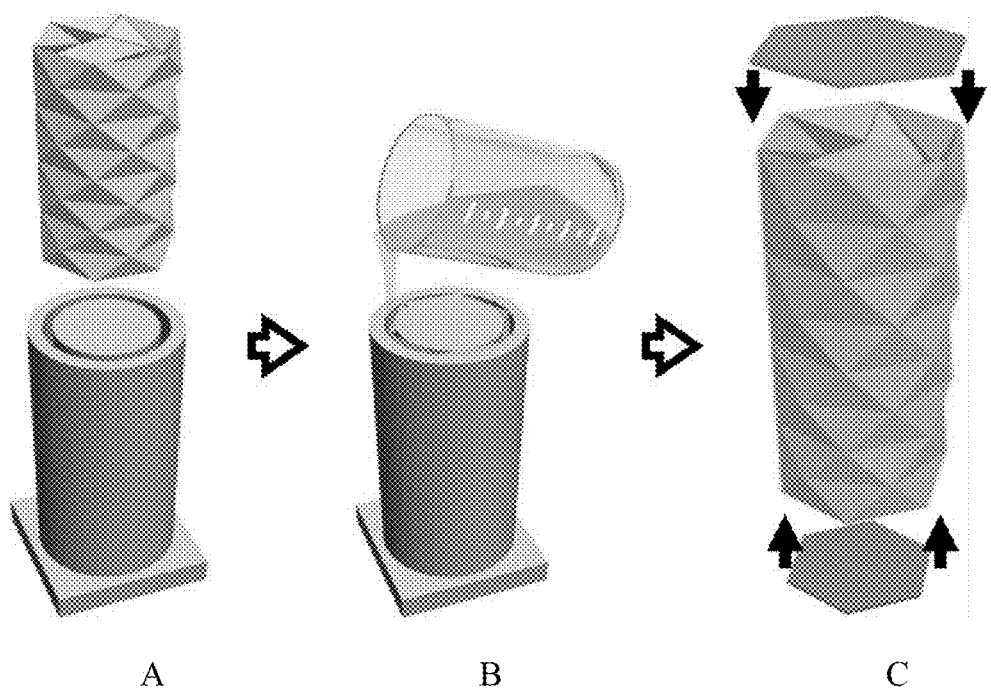
FIGS. 10A-10C show a schematic diagram illustrating a process to fabricate an elongation actuator with paper folded into a bellows-like pattern around a cylindrical pneumatic channel according to one or more embodiments, in which (A) the paper with the pattern shown in FIGS. 9A and 9B is first inserted into a cylindrical mold, (B) an elastomer pre-mixture is then poured into the mold, and cured with the patterned paper embedded; and (C) the pneumatic channel is completed by sealing the top and bottom completes the pneumatic channel.

The fabrication process is similar to the one shown in FIG. 5, with a few modifications noted below. The paper with the pattern shown in FIGS. 8-9 was first folded and then unfolded and then inserted into a cylindrical mold, as illustrated in FIG. 10. An elastomer pre-mixture is then poured into the mold. The origami structure was covered with Ecoflex prepolymer, and degassed at 36 Torr for 3 min. Once the origami structure was saturated with liquid polymer, it was removed from the mold and partially cured at 100° C. for 1 min (extended, as a flat cylinder, in vertical position) to obtain a uniform coating of the paper. Then the partially cured paper-elastomer composite was completely folded, held with paper clips, and fully cured at 60° C. for 15 min. This resulted in a cured polymer having the shape of the folded paper template embedded in the polymer. Finally, sealing the top and bottom completed the pneumatic channel. The paper-elastomer pleated structure was glued (using Ecoflex) to paper caps, leaving an internal sealed chamber for pneumatic activation.

Figure 11:
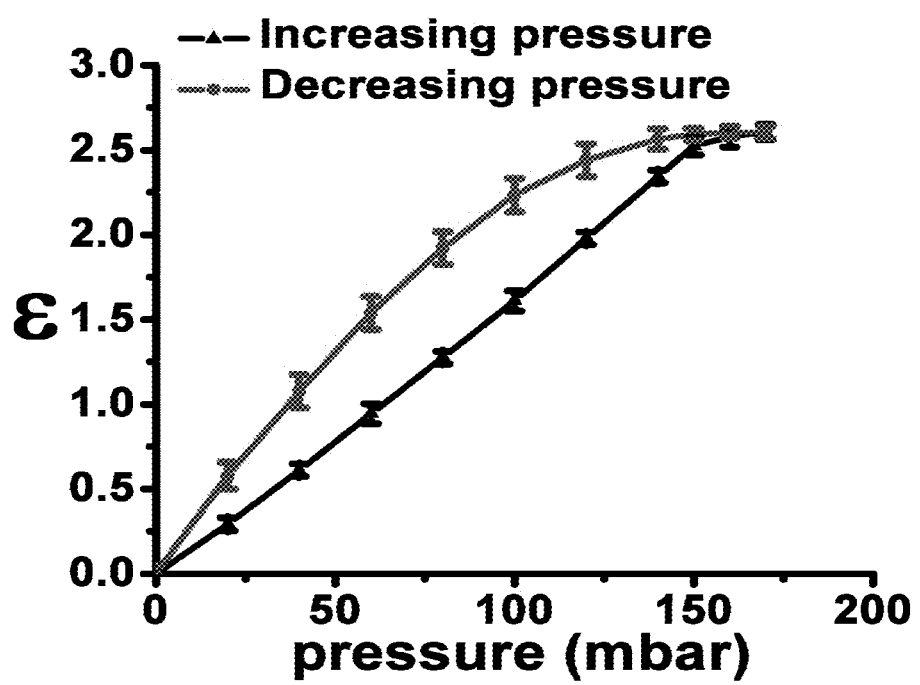
FIG. 11 is a plot illustrating the dependence of the extension factor $\epsilon$ (relative to its original length in the resting state) on pressure, after 50 pressurization/depressurization cycles for the actuator of FIG. 12.
Figure 12:
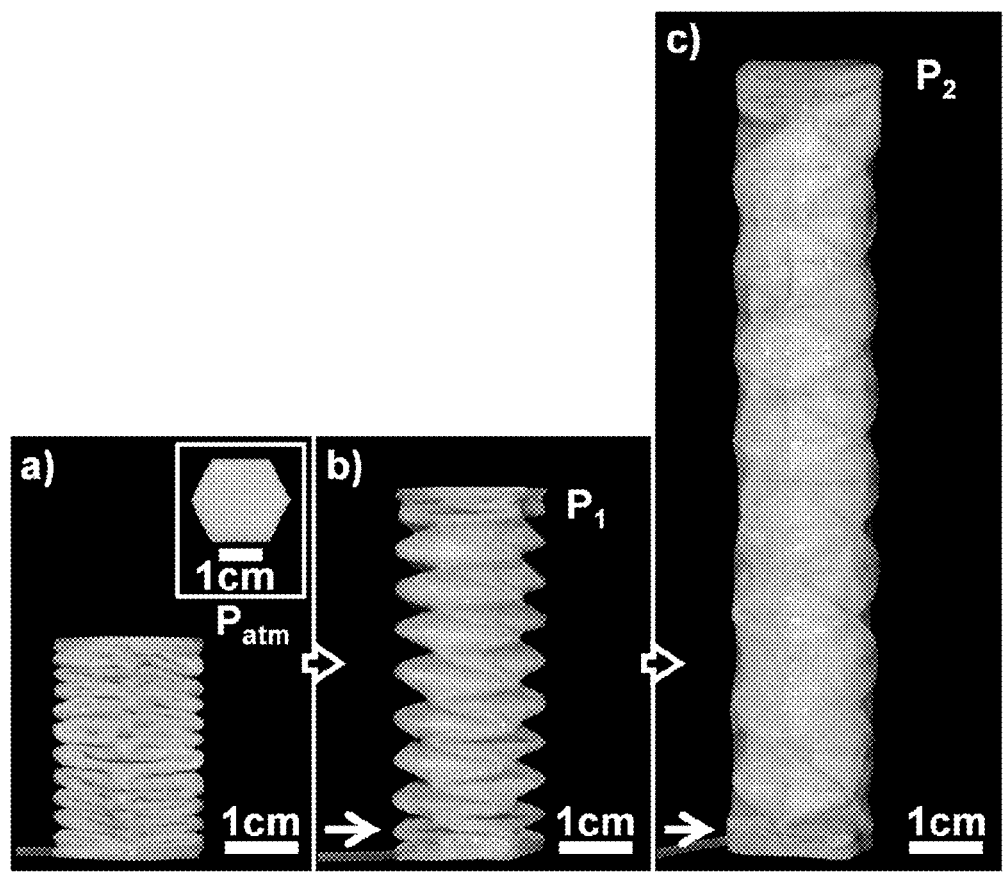
FIGS. 12a-12c illustrates the actuation of a soft paper/Ecoflex extensor according to one or more embodiments, in which (a) is a side view showing the resting of the device, and (b) and (c) are side views of the device under atmospheric pressure ($P_{atm}$), $P_1$=50 mbar, and $P_2$=170 mbar over atmospheric pressure, respectively.

FIG. 12 shows a bellows structure with a series of ten crease line patterns that correspond to the number of bellow chambers in the device. However, there is no practical limit to the number of creases/bellows that can be incorporated into the device. In one or more embodiments, the actuator includes between 2-100 bellow chambers, or between 5-50 or between 30-50 bellow chambers. In one or more embodiments, the device includes about 10, or about 20, or about 30, or about 40, or about 50, or about 60, or about 70, or about 80, or about 90, or about 100 bellow chambers. FIGS. 12A-12C show the resting and actuated states of such a device under atmospheric pressure (Patm), $P_1$=50 mbar, and $P_2$=170 mbar over atmospheric pressure, respectively. As air is introduced into the device, the pleats unfold, expanding the device and extending the device along its vertical axis. The activation time of this actuator depends on how fast the air can be introduced into the device. By feeding the actuator with a compressed air source (600 mbar; 1.14 mm I.D. inlet tube with a length between pressure source and device of 25 cm), the actuator reached full extension in 352 ms (an average velocity during extension of 0.23 m/s; for reference, the speed of sound in dry air at 20° C. is 343.2 m/s). FIG. 11 shows the pressure dependence of the extension (relative to its original length in the resting state) after 50 pressurization/depressurization cycles. As demonstrated in FIG. 11, this structure extends significantly (up to $\epsilon$=3.61) when pressurized at 170 mbar over atmospheric pressure. When the pressure in the pneumatic chamber decreased, the actuator folded up and recovered its resting shape. There was modest hysteresis between the curves describing pressurization and depressurization, as observed in FIG. 11. This hysteresis is due to some mechanical resistance in the paper-elastomer composite to refolding.

Figure 13:
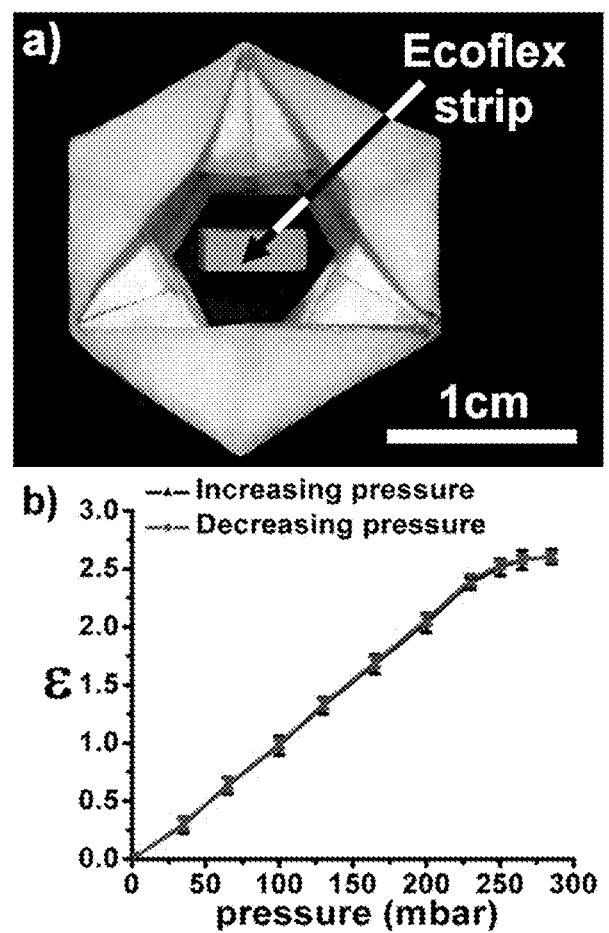
FIGS. 13a-13b show an origami actuator according to one or more embodiments with the hysteresis compensated by the elastic recovery of an Ecoflex strip that joins the top and the bottom of the actuator, in which (a) is a top view of the origami structure without the top cap; the Ecoflex strip is glued with more Ecoflex to the top and bottom cap of the actuator; and (b) is a plot illustrating the pressure dependence of the extension factors of the actuator relative to its length at rest.

Counteracting the mechanical resistance of the paper can decrease this hysteresis. This can be accomplished by using a spring as a restoring force to assist in the refolding of the actuator. A simple method to build a restoring force into the actuator is to connect both of its caps with an internal elastomeric Ecoflex strip. FIG. 13A shows an origami actuator with the hysteresis compensated by the elastic recovery of an Ecoflex strip that joins the top and the bottom of the actuator (top view of the origami structure without the top cap). The Ecoflex strip is glued with more Ecoflex to the top and bottom cap of the actuator. Upon expansion, the internal Ecoflex strip is stretched; upon release of internal air pressure, the stretched Ecoflex strip provides a restoring force to the device. The Ecoflex strip does not provide significant resistance to expansion, as is illustrated by the pressurization and depressurization curves in FIG. 13B, in which pressurization to 150 mbar over atmospheric pressure produced $\epsilon$=1.5, which compares well with the extension factor of $\epsilon$=2.5 on a non-reinforced structure of similar geometry (FIG. 11). In this case, the Ecoflex strip housed into the actuator helps the actuator to fold up when the pressure decreases minimizing the hysteresis. In this structure, when the internal pressure is reduced, however, the elastic restoring force exerted by the internal Ecoflex strip exceeds the mechanical resistance of the paper-elastomer composite to folding, and effectively eliminates the hysteresis.

Figure 14:
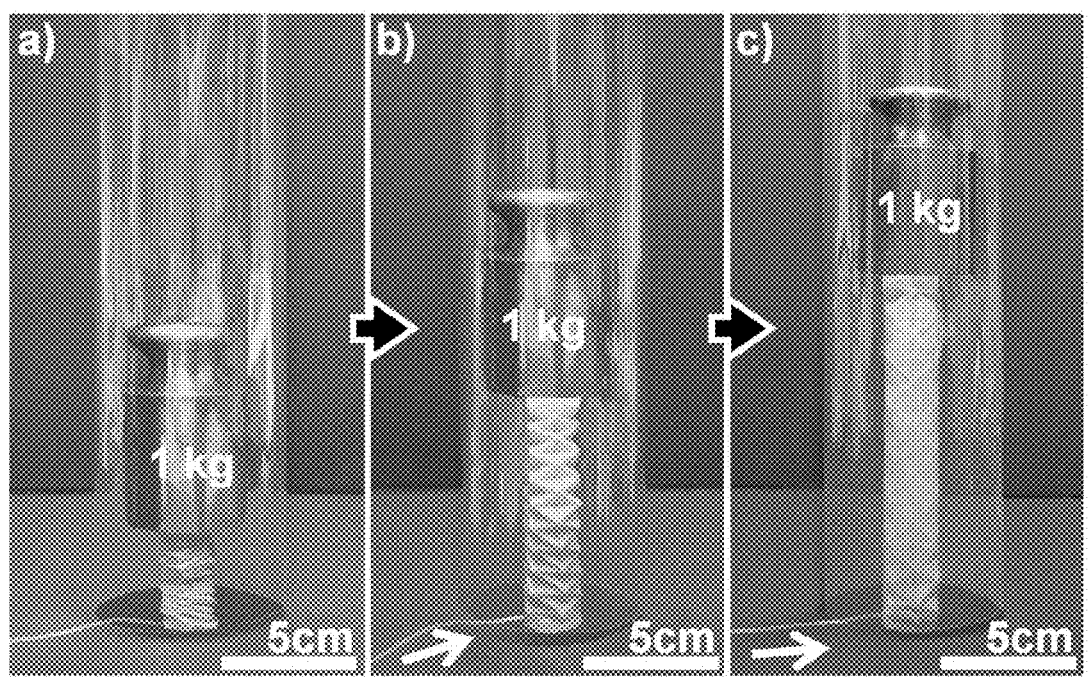
FIGS. 14a-14c show an origami extension actuator according to one or more embodiments lifting a standard weight of 1 kg.

Paper-Ecoflex pleated structures are light. For example, the device shown in FIG. 12 weighs 8.3 g. These actuators can, however, lift loads 120 times their weight. FIG. 14 shows an origami actuator lifting a mass of 1 kg upon applying a pressure of 238 mbar over atmospheric pressure to its pneumatic chamber. A transparent tube was used to constrain the weight and origami actuator to a common vertical axis during the lifting. The pressure inside the pneumatic chamber of the actuator required to lift the weight to maximum extension of the actuator was 238 mbar over atmospheric pressure. The actuator weighed 8.3 g. The arrows indicate the polyethylene tubes used to supply compressed air for actuation. These soft actuators can manipulate objects with moderate performance (for example, they can lift loads up to 120 times their weight).

Angular Extensor and Other Actuators

Pleated structures offer many possibilities for generating complex actuation simply by local modification of the pleats. In some embodiments, a restraining member can be secured to one side of the pleated structures to restrict expansion at one location. When the internal chamber of the actuator is pressurized, the restrained pleats are unable to open; this constraint forces an angular elongation of the actuator, resulting in a bending motion. The pleated structure can be restrained in a variety of ways. For example, pleats can be clamped or held together using mechanical devices, such as pins, clamps, stables, etc. In other embodiments, the pleats can be attached to a string, or line or other restraining strip that is attached to a portion or all of the pleats along any of the edges of the structure. In other embodiments, the pleats can be bonded or glued together.

Figure 15:
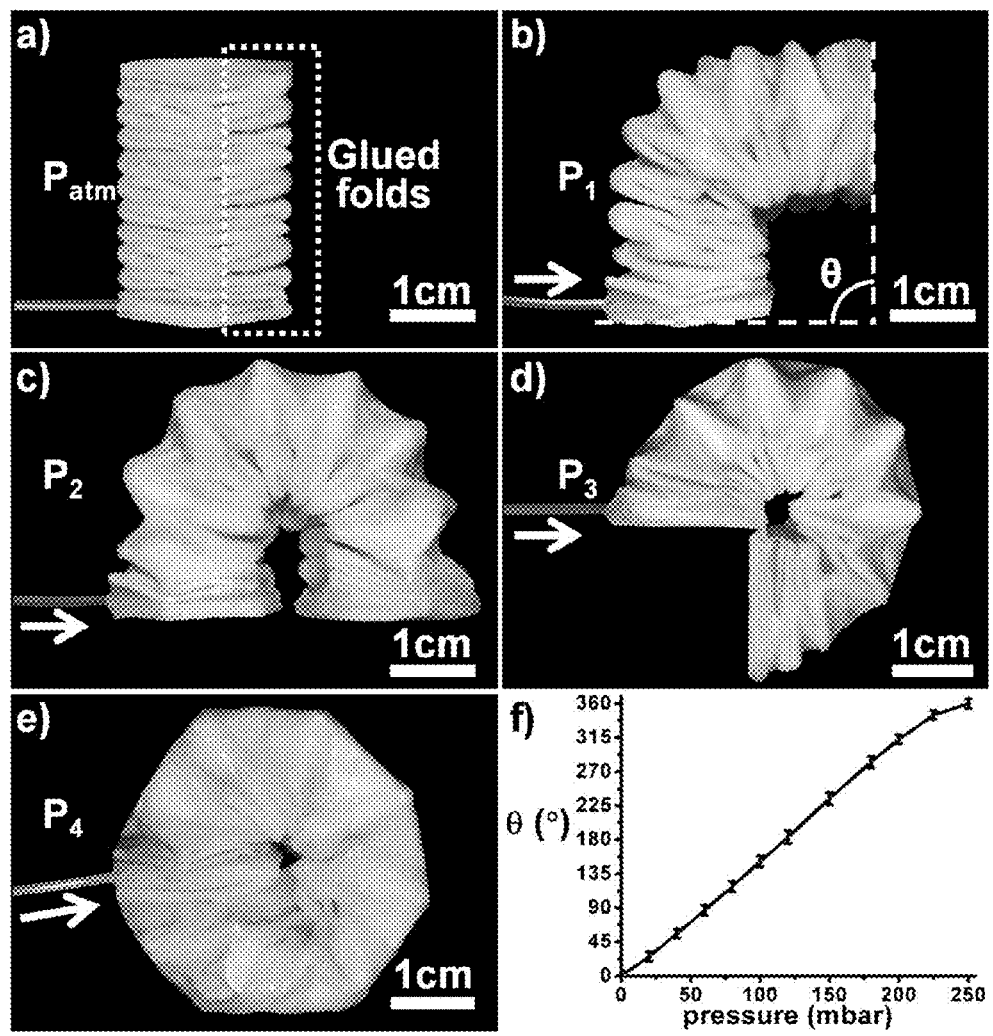
FIGS. 15a-15f illustrate a biased bellows actuator, fabricated by gluing folds of the elongation actuator in FIG. 12A, in which (a) is a side view of the actuator according to one or more embodiments showing the three-dimensional bellows-like pattern of the paper at a resting state and indicating the glued folds; (b), (c), (d) and (e) show the actuated states of such the under $P_1$=60 mbar, $P_2$=125 mbar, $P_3$=175 mbar, and $P_4$=250 mbar over atmospheric pressure, respectively; and (f) is a plot demonstrating the dependence of the angle $\theta$ on pressure after 50 cycles of pressurization/depressurization for the actuator of FIG. 15a, in which the small standard deviation (error bars) indicates that $\theta$ does not change significantly as a function of the number of cycles.

FIG. 15 demonstrates how the same type of bellowed structure shown in FIG. 12 can perform a different movement when the pleats of one of its lateral faces are glued together with Ecoflex. When the internal chamber of the actuator is pressurized, the glued pleats are unable to open; this constraint forces an angular elongation of the actuator. FIG. 15 is a photograph of a three-dimensional bellows-like pattern of the paper, the same design in FIG. 5, in which the edges of the pleats have been glued together where indicated. The fabrication process is similar to the one shown in FIG. 5 except that the right edges of the paper structure were glued together. Due to the glued folds along the right side of the structure, elongation is possible only from the left side of the device. FIGS. 15A-15E show the resting and actuated states of such a device under $P_1$=60 mbar, $P_2$=125 mbar, $P_3$=175 mbar, and $P_4$=250 mbar over atmospheric pressure, respectively. The degree of bending increases with increasing pressurization. Dependence of the angle $\theta$ on pressure after 50 cycles of pressurization/depressurization is shown in the plot of the angle $\theta$ vs. pressure in FIG. 15F. The testing after 50 cycles of pressurization and depressurization demonstrates the robustness and reversibility of the actuation device. The small standard deviation (error bars) indicates that $\theta$ does not change significantly as a function of the number of cycles.

Although the examples illustrated here show the constraining element at the outer surface of the structure (e.g., the edges of the pleats of folds are joined), and it is contemplated that the constraining element can be located anywhere along the folded surfaces or edges of the device. By way of example, the inner edges of the pleats can be bonded together; or the faces of the pleats can be bonded together.

In some embodiments, the constrained regions can include the entire face of the pleated structure. In this case, the entire structure in involved in the angular extension of the structure. In other embodiments, the constrained region includes only a portion of a face of the pleated structure. In this case, a portion of the device experiences angular extension (or bending) while the remainder of the structure extends linearly. In still other embodiments, the contained regions are on different faces of the structure. In these cases, angular extension can occur in a number of directions. Complex actuation patterns are thereby envisioned.

Figure 16:
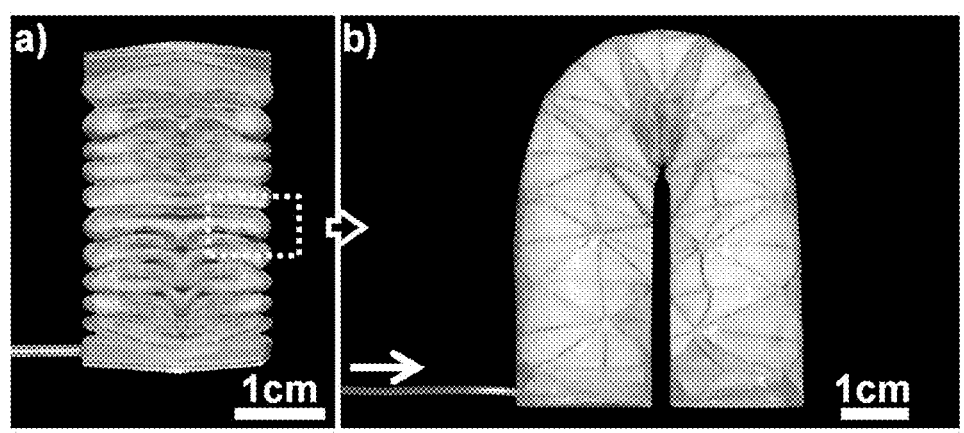
FIGS. 16a-16b show a biased origami extension actuator combining linear extension and bending according to one or more embodiments in its (a) resting state and indicating the location of glued folds; and (b) activated state.
Figure 17:
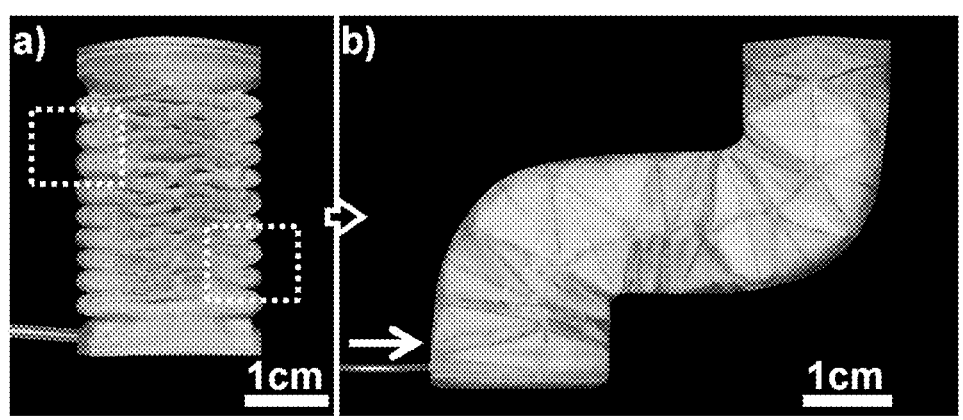
FIGS. 17a-17b show a biased origami extension actuator with two bending modes according to one or more embodiments in its (a) resting state and indicating the location of glued folds; and (b) activated state.
Figure 18:
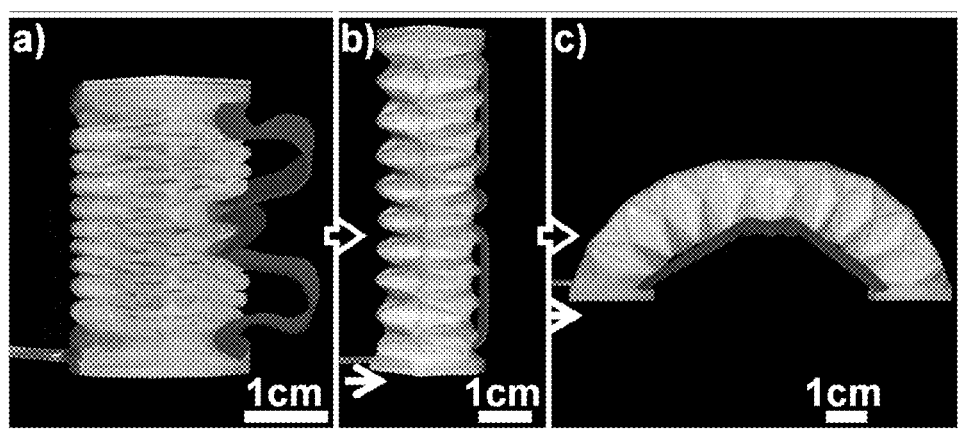
FIGS. 18a-18c shows a biased origami extension actuator that illustrates the concept of sequential actuation according to one or more embodiments, in its (a) resting state in which the tethered folds are clearly visible; (b) the soft actuator extends linearly during the beginning of the pressurization and (c) then bends (with a curvature defined by the strain limiting ribbon attached).

FIGS. 16, 17, and 18 show how structures like the ones shown in FIGS. 9, 12, and 15 can perform different types of actuation by gluing together different pleats. In FIG. 16, the pleats in the center of the device only are glued together, as indicated in FIG. 16A. Upon actuation, linear extension is restrained only in the region where the pleats are glued together, to provide a bellows actuator that provides a combination of bending and linear extension to bend in a U-shape, as shown in FIG. 16B. In FIG. 17A, pleats in two different locations on opposite sides of the device are glued together; the pleated regions are offset from one another to provide bellows actuator with two bending modes, as shown in FIG. 17B.

In other embodiments, a bellows actuator is prepared with a strip limiting the expansion of the pleats. The strip was built on the outside of the device for the sake of clarity, as shown in FIG. 18A; however, the restraining band could also be included in the interior cavity of the actuator. FIG. 18A shows the case in which the expansion of the pleats is partially constrained by the attachment of a paper strip soaked in Ecoflex with a length shorter than the length of the actuator at full extension. In this case, the actuator expands linearly until the paper-elastomer strip extends to its maximum, as shown in FIG. 18B, and thereafter in a curve, as shown in FIG. 18C. The length of the strip attached to the pleats of the bellows structure controls the radius of curvature of the actuator upon pressurization.

Controlling Light Emission with Soft Material Composites

The procedure used to embed paper structures in Ecoflex can be used to provide functions other than mechanical actuation. In one embodiments, the composite structure is use to control emission of light.

Figure 26:
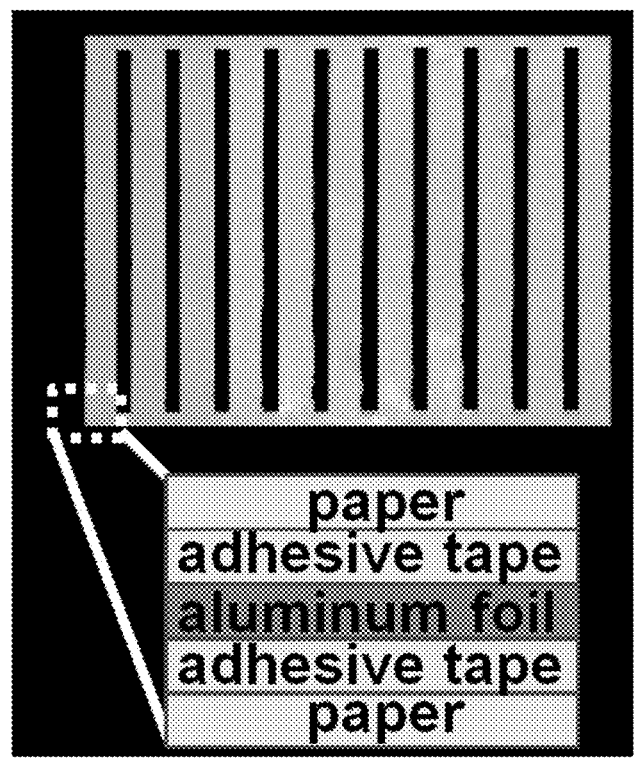
FIG. 26 is a plan view of a paper-elastomer composite actuator according to one or more embodiments having translucent and opaque regions.
Figure 27:
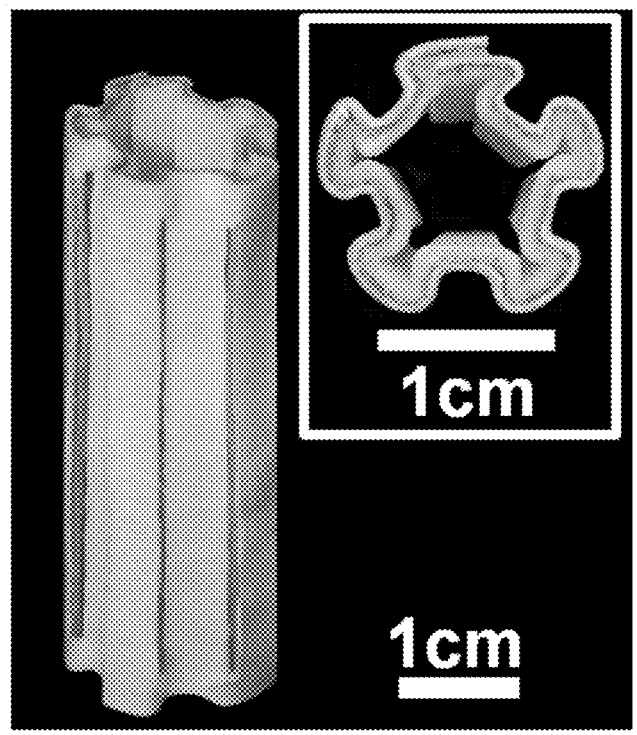
FIG. 27 is a side view (inset is a top view) of a paper-elastomer composite actuator according to one or more embodiments that has been assembled into a lantern configuration that shields translucent regions from view.
Figure 28:
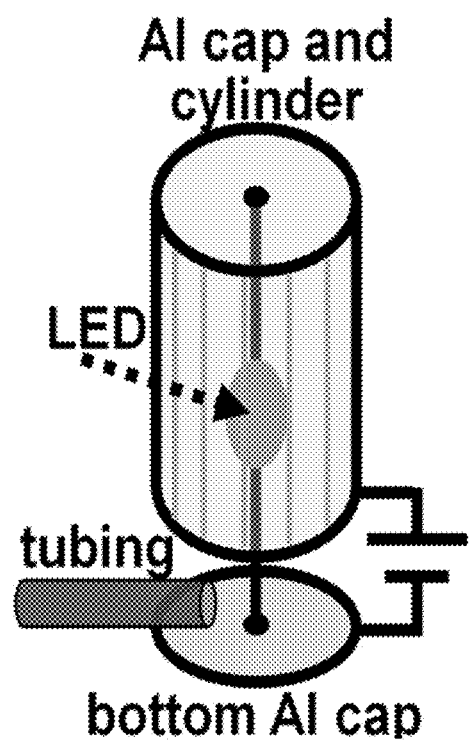
FIG. 28 is schematic illustration of a lantern made from a paper-elastomer composite actuator according to one or more embodiments.
Figure 29:
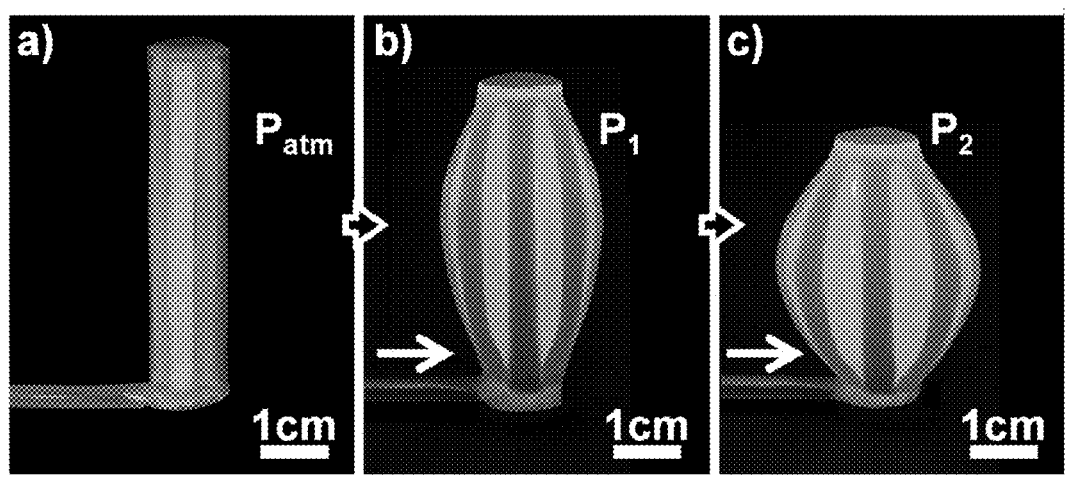
FIGS. 29a-29c show an actuating lantern according to one or more embodiments, in which (a) shows a side view of the actuator in its resting state (no light visible); (b) and (c) show the actuated states of the device under an applied pressure of $P_1$=+100 mbar and $P_2$=+285 mbar over atmospheric pressure, respectively.
Figure 30:
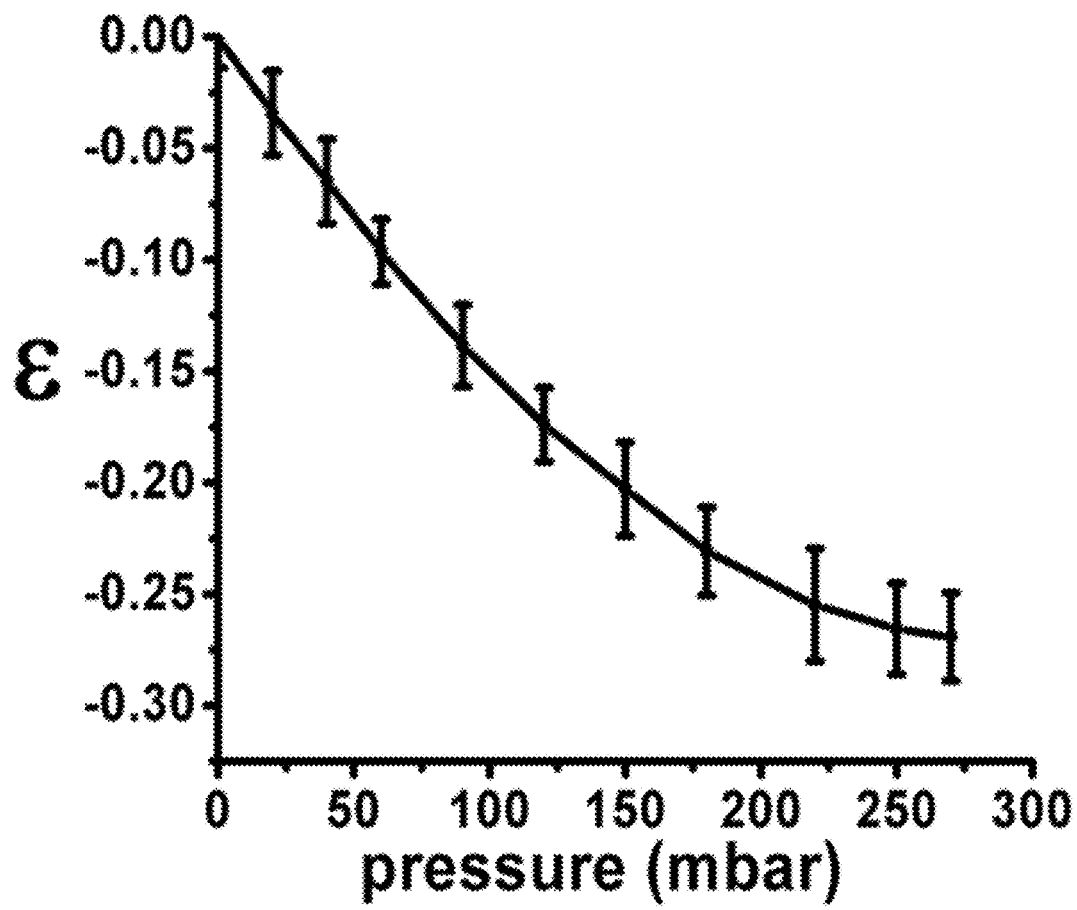
FIG. 30 is a plot showing the pressure dependence of the elongation factor $\epsilon$ after 50 pressurization/depressurization cycles for the actuator of FIG. 29.
Figure 31:
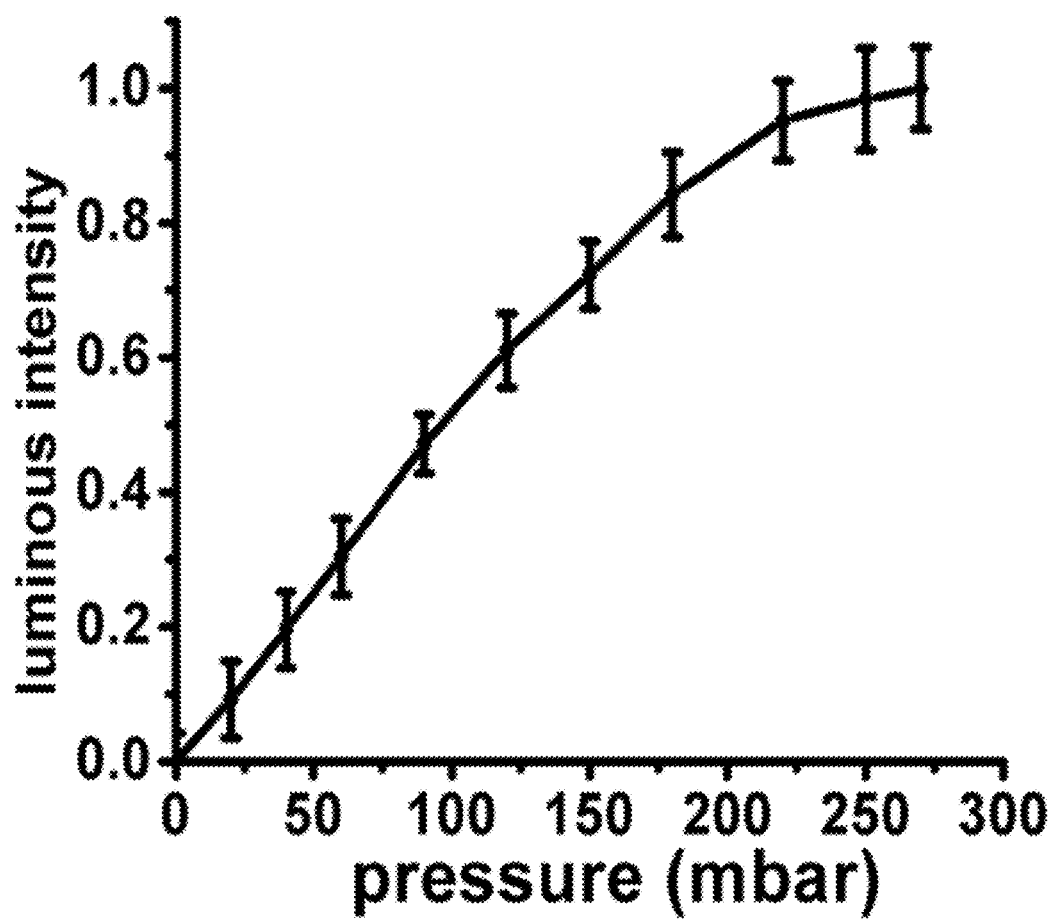
FIG. 31 is a plot showing the luminous intensity as a function of pressure after 50 pressurization/depressurization cycles for the actuator of FIG. 29.

FIG. 28 shows a pneumatic actuator that acts like a lantern by opening translucent windows hiding a blue light-emitting diode (LED) that is housed in the pneumatic chamber. FIG. 26 is a plan view of the actuator before assembly. This actuator embedded aluminum foil in a multilayer structure of paper-adhesive tape-aluminum foil-adhesive tape-paper to make a bendable shield that blocks the light. The sheet included alternating regions of cut-out areas and laminated paper strips. The folded structure was rolled into a cylinder to fabricate the actuator, as illustrated in FIG. 27. The folds are made to provide the paper strips facing outward so as to form an opaque outer surface. The aluminum foil was also used to make the electrical contacts between the LED and the external voltage source (see FIG. 28). Aluminum foil was used (composed with paper and Ecoflex) to fabricate a bendable structure that allows electrical conduction to a blue LED housed in the internal chamber from the outside. The anode of the LED is connected to the top aluminum cap (electrically connected through the aluminum cylinder). The cathode of the LED is connected to the bottom aluminum cap (isolated from the anode with Ecoflex). FIGS. 29A-29C show the resting and actuated states of such a device with the LED on. Patm=atmospheric pressure, $P_1$=100 mbar, and $P_2$=285 mbar over atmospheric pressure, respectively. The exposure time was longer for e) and f) than d). g) Dependence of the contraction with the applied pressure after 50 pressurization/depressurization cycles. Both the contraction and the normalized intensity emitted by this actuator upon pressurization were characterized (see FIGS. 30, and 31), which illustrate the dependence of the normalized luminous intensity (in the far field) with the internal pressurization of the device.). Regulating the pressure inside the actuator easily controls both light emission and mechanics (in this instance, using coupled actuation). This type of coupling may be useful in connecting light emission to motion, and in control strategies that involve sensing actuators at a distance optically.

The structures can be modified as will be apparent to one of skill in the art. For example, straightforward engineering using tougher elastomers and higher pressures will allow them to generate higher forces and strengths, making soft robotics that can be suitable for manipulating heavy objects and/or to provide greater resistance and susceptible to damage by puncture or cutting. These actuators require a source of compressed air for continuous operation (the tether required to connect the actuator to the gas, however, can be small and flexible). Full actuation of these systems was achieved when the valve pressure on the gas source was 400-700 mbar (40-70 kPa) over atmospheric pressure. Soft robotics can be modified to carry on board pressure activators. See, for example, co-pending PCT Application No. PCT/US2012/059226, filed Oct. 8, 2012 and entitled "SYSTEMS AND METHODS FOR ACTUATING SOFT ROBOTIC ACTUATORS", which is hereby incorporated in its entirety by reference. In addition, pressurization can be carried out using other pressure sources in addition to compressed air. They can also be combined with other (for example, electrical) components to increase their functionality.

The invention claimed is:

1. A composite actuator comprising:
   a flexible polymer defining a pneumatic chamber, configured to contain pressurizable fluid;
   a woven or non-woven fabric sheet embedded into at least a portion of the flexible polymer, wherein the flexible polymer conforms at least in part to the shape of the fabric sheet, wherein the fabric sheet comprises a plurality of creases configured and arranged to provide a plurality of folds to the flexible polymer when in a folded state and further configured to be capable of unfolding upon pressurization of the pneumatic chamber;
   an inlet coupled to the pneumatic chamber for receiving the pressurizable fluid; and
   an adhesive member joining at least two of folds of the flexible polymer to control a motion of the composite actuator upon unfolding of the flexible polymer, wherein the adhesive member joins a portion of the folds or substantially all the folds along a face of the composite actuator.

2. The composite actuator of claim 1, wherein the flexible polymer defining a pneumatic chamber comprises a cylinder having upper and lower end caps.

3. The composite actuator of claim 1, wherein the adhesive member is a non-extensible strip.

4. The composite actuator of claim 1, wherein the adhesive member is an adhesive.

5. The composite actuator of claim 1, further comprising a spring positioned to restore the actuator to its folded state.

6. The composite actuator of claim 5, wherein the spring is an extensible polymer strip spanning two spaced apart folds of the composite actuator, wherein the extensible polymer strip is in an expanded state when the extensible polymer strip is in an unfolded state and is in a resting state when the extensible polymer strip is in a folded state.

7. A method of actuation comprising:
   providing a composite actuator according to claim 1, and pressurizing the composite actuator at a pressure greater than the resting pressure to actuate the composite actuator by unfolding one or more folds of the flexible polymer.

8. The method of actuation according to claim 7, wherein the actuation comprises a linear extension of the composite actuator.

9. The method of actuation according to claim 8, wherein the linear actuation is used to push or lift an object.

10. The method of actuation according to claim 7, wherein the folds of the composite actuator are joined along a face of the composite actuator and actuation comprises bending of the composite actuator.

11. A composite actuator comprising:
an extensible polymer defining a pneumatic chamber, configured to contain pressurizable fluid;
a woven or non-woven sheet of fabric embedded into at least a portion of the extensible polymer, wherein the sheet of fabric comprises a plurality of slits distributed about a central axis of the composite actuator, wherein, upon pressurization of the pneumatic chamber, the pneumatic chamber is configured to expand radially to provide a motion of the composite actuator; and an inlet coupled to the pneumatic chamber for receiving the pressurizable fluid.

12. The composite actuator of claim 11, wherein the plurality of slits span substantially a full axial length of the composite actuator.

13. The composite actuator of claim 11, wherein the plurality of slits span between 99% and 60% of the axial length of the composite actuator.

14. The composite actuator of claim 11, wherein the pneumatic chamber comprises a cylinder having upper and lower end caps.

15. The composite actuator of claim 11, wherein the sheet of fabric comprises:
an upper band joining an upper edge of the plurality of slits; and
a lower band joining the lower edge of the plurality of slits, wherein the actuator is configured to contract along the axial direction upon pressurization of the pneumatic chamber.

16. The composite actuator of claim 11, wherein the sheet of fabric comprises paper.

17. A method of actuation comprising:
providing a composite actuator according to claim 11, and pressurizing the composite actuator at a pressure greater than the resting pressure to actuate the composite actuator by radially expanding the composite actuator.

18. The method of actuation of claim 17, wherein the composite actuator contracts along the axial direction upon pressurization of the pneumatic chamber.

19. A composite actuator comprising:
an extensible polymer defining a pneumatic chamber, configured to contain pressurizable fluid;
a first woven or non-woven sheet of fabric embedded into at least a portion of the extensible polymer, wherein the first sheet of fabric is configured to cause the extensible polymer to deform into a predetermined shape upon actuation, thereby providing a motion of the composite actuator;
an inlet coupled to the pneumatic chamber for receiving the pressurizable fluid to actuate the composite actuator; and
an adhesive member joining at least two of folds of the extensible polymer to control a motion of the composite actuator upon unfolding of the extensible polymer, wherein the adhesive member joins a portion of the folds or substantially all the folds along a face of the composite actuator.

20. The composite actuator of claim 19, wherein the first sheet of fabric comprises a plurality of creases configured and arranged to provide a bellows structure to the extensible polymer.

21. The composite actuator of claim 19, wherein the plurality of creases is arranged homogeneously across the sheet of fabric.

22. The composite actuator of claim 19, wherein the first sheet of fabric is a strip that is helically wound around a central axis of the pneumatic chamber.

23. The composite actuator of claim 19, further comprising a second sheet of fabric embedded into the extensible polymer, and wherein the first sheet is offset laterally from the second sheet along an axial direction of the extensible polymer, and wherein the first and second sheets are configured to restrict movement of the extensible polymer in at least two locations to provide a bending motion in two different directions upon pressurization of the pneumatic chamber.

24. The composite actuator of claim 23, wherein the first sheet and the second sheet restrict movement of the extensible polymer in a two dimensional plane.

25. The composite actuator of claim 23, further comprising a third sheet of fabric, wherein the first sheet, the second sheet, and the third sheet are laterally offset from one another.

26. The composite actuator of claim 23, wherein there is no lateral overlap between the first sheet and the second sheet.

27. The composite actuator of claim 23, wherein a portion of the first sheet laterally overlaps a portion of the second sheet.

28. A method of making a composite actuator, comprising:
pre-stressing (folding) a woven or non-woven sheet of fabric to introduce a plurality of creases that provide a plurality of bellows capable of expansion and contraction;
flattening the prestressed sheet and infusing the sheet with an elastomer precursor;
folding the infused sheet to form an actuator having the plurality of bellows capable of expansion and contraction; and
curing the elastomer precursor to obtain a composite actuator that comprises the plurality of bellows in its resting state.

29. An actuatable lantern comprising:
a light permeable flexible polymer defining a pneumatic chamber, wherein a light source is housed within the chamber; and
a woven or non-woven sheet of fabric embedded in the flexible polymer, wherein the sheet of fabric comprises a plurality of slits arranged along an axial direction of the flexible polymer, wherein, upon pressurization of the pneumatic chamber, the sheet of fabric is configured to provide a predetermined deformation to the flexible polymer, thereby providing a motion of the flexible polymer; and an inlet coupled to the pneumatic chamber for receiving the pressurizable fluid.

* * * * *